United States Patent
Togawa et al.

(10) Patent No.: US 10,832,687 B2
(45) Date of Patent: Nov. 10, 2020

(54) AUDIO PROCESSING DEVICE AND AUDIO PROCESSING METHOD

(71) Applicant: FUJITSU LIMITED, Kawasaki-shi, Kanagawa (JP)

(72) Inventors: Taro Togawa, Kawasaki (JP); Sayuri Nakayama, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 16/122,098

(22) Filed: Sep. 5, 2018

(65) Prior Publication Data
US 2019/0080699 A1     Mar. 14, 2019

(30) Foreign Application Priority Data
Sep. 13, 2017   (JP) ................................ 2017-175635

(51) Int. Cl.
| | |
|---|---|
| *G10L 17/26* | (2013.01) |
| *G06T 11/20* | (2006.01) |
| *G06F 17/18* | (2006.01) |
| *G10L 25/90* | (2013.01) |
| *G10L 25/63* | (2013.01) |
| *G10L 25/15* | (2013.01) |
| *G10L 25/18* | (2013.01) |

(52) U.S. Cl.
CPC .............. *G10L 17/26* (2013.01); *G06F 17/18* (2013.01); *G06T 11/206* (2013.01); *G10L 25/15* (2013.01); *G10L 25/18* (2013.01); *G10L 25/63* (2013.01); *G10L 25/90* (2013.01)

(58) Field of Classification Search
USPC ....................................................... 704/1–504
See application file for complete search history.

(56) References Cited

U.S. PATENT DOCUMENTS

| | | | | |
|---|---|---|---|---|
| 4,944,018 A | * | 7/1990 | Bose ........................ | H03G 3/32 381/102 |
| 5,729,227 A | * | 3/1998 | Park ....................... | H04H 60/04 341/100 |
| 5,819,211 A | * | 10/1998 | Jeong ................ | G11B 20/00007 704/204 |
| 8,311,821 B2 | * | 11/2012 | Breebaart ............... | G06F 16/70 704/234 |
| 8,386,257 B2 | * | 2/2013 | Irie ......................... | G10L 17/26 704/255 |

(Continued)

FOREIGN PATENT DOCUMENTS

JP     2010-054568     3/2010

OTHER PUBLICATIONS

D. Talkin, "A Robust Algorithm for Pitch Tracking (RAPT)," in Speech Coding & Synthesis, W. B. Kleijn and K K. Pailwal (Eds.), Elsevier, pp. 495-518, 1995 (23 pages).

*Primary Examiner* — Marcus T Riley
(74) *Attorney, Agent, or Firm* — Fujitsu Patent Center

(57) ABSTRACT

There is provided an audio processing device including a memory, and a processor coupled to the memory and the processor configured to detect a first acoustic feature amount and a second acoustic feature amount of an input audio, calculate a coefficient for the second acoustic feature amount based on a time change amount by calculating the time change amount of the first acoustic feature amount, and calculate a statistical amount for the second acoustic feature amount based on the coefficient.

13 Claims, 23 Drawing Sheets

(56) References Cited

U.S. PATENT DOCUMENTS

| | | | | |
|---|---|---|---|---|
| 8,892,497 B2* | 11/2014 | Konuma | ................ | G10L 25/48 |
| | | | | 706/54 |
| 2003/0236663 A1* | 12/2003 | Dimitrova | ............... | G10L 17/00 |
| | | | | 704/245 |
| 2006/0196337 A1* | 9/2006 | Breebart | ............... | G06F 16/683 |
| | | | | 84/1 |
| 2009/0265170 A1* | 10/2009 | Irie | ........................ | G10L 17/26 |
| | | | | 704/236 |
| 2012/0136823 A1* | 5/2012 | Konuma | ............... | G06Q 10/10 |
| | | | | 706/54 |
| 2014/0126745 A1* | 5/2014 | Dickins | ................... | H04R 3/02 |
| | | | | 381/94.3 |
| 2018/0173400 A1* | 6/2018 | Lehtiniemi | ........... | G06F 16/683 |
| 2019/0080699 A1* | 3/2019 | Togawa | ................ | G06T 11/206 |

* cited by examiner

AUDIO PROCESSING DEVICE AND AUDIO PROCESSING METHOD

CROSS-REFERENCE TO RELATED APPLICATION

This application is based upon and claims the benefit of priority of the prior Japanese Patent Application No. 2017-175635, filed on Sep. 13, 2017, the entire contents of which are incorporated herein by reference.

FIELD

The embodiments discussed herein are related to an audio processing device and an audio processing method.

BACKGROUND

In recent years, there has been an increasing tendency for many companies to place emphasis on customer satisfaction, and there is a growing need to grasp the impression of responders and the emotions of customers in the conversation between the responders and the customers. The impression of the responders and the emotion of the customers are often indicated in the voice.

For example, in the related art, there is a method of detecting a pitch frequency of a voice during a call and determining the impression and emotion of the voice.

Related technologies are disclosed in, for example, Japanese Laid-Open Patent Publication No. 2010-054568.

SUMMARY

According to an aspect of the invention, an audio processing device includes a memory, and a processor coupled to the memory and the processor configured to detect a first acoustic feature amount and a second acoustic feature amount of an input audio, calculate a coefficient for the second acoustic feature amount based on a time change amount by calculating the time change amount of the first acoustic feature amount, and calculate a statistical amount for the second acoustic feature amount based on the coefficient.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of a technique capable of accurately estimating the impression of an utterance will be described in detail with reference to the accompanying drawings. In addition, it is noted that the present disclosure is not limited by the embodiments.

First Embodiment

A reference technique will be described before describing a first embodiment. The reference technique is not the related art. In the reference technique, a graph based on each pitch frequency is generated by detecting a height of a voice (pitch frequency) at every predetermined time interval from a voice signal. In the reference technique, the brightness of sound is evaluated based on a spread of the generated graph. The pitch frequency corresponds to a base frequency.

Figure 1:
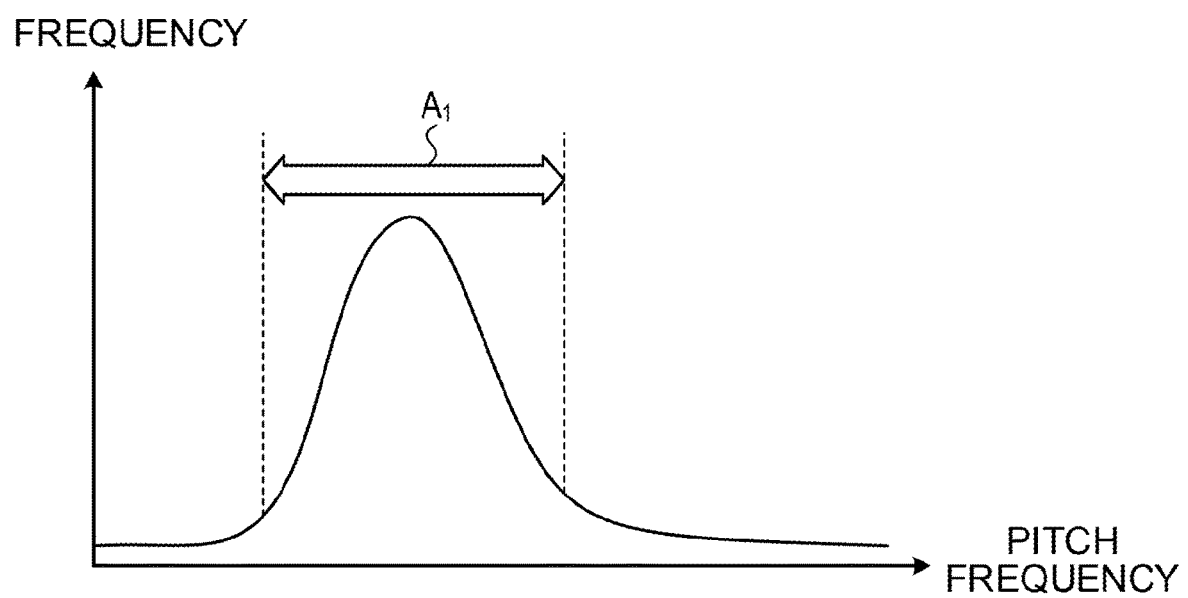
FIG. 1 is a diagram illustrating an example of a graph illustrating a frequency distribution of a pitch frequency according to a reference technique.

FIG. 1 is a diagram illustrating an example of a graph representing a frequency of occurrence distribution of a pitch frequency according to a reference technique. In the graph illustrated in FIG. 1, a horizontal axis is an axis corresponding to the pitch frequency and a vertical axis is an axis corresponding to the frequency. In the reference technique, a range in which the frequency becomes greater than a predetermined frequency is detected as a spread of the distribution, and the brightness of the voice is evaluated by a wide or narrow spread of the distribution.

In the example illustrated in FIG. 1, the reference technique detects range $A_1$ as the spread of the distribution. For example, the reference technique evaluates that the voice is bright when range $A_1$ is wider than a predetermined range. Meanwhile, the reference technique evaluates that the voice is dark when range $A_1$ is narrower than the predetermined range.

Figure 2:
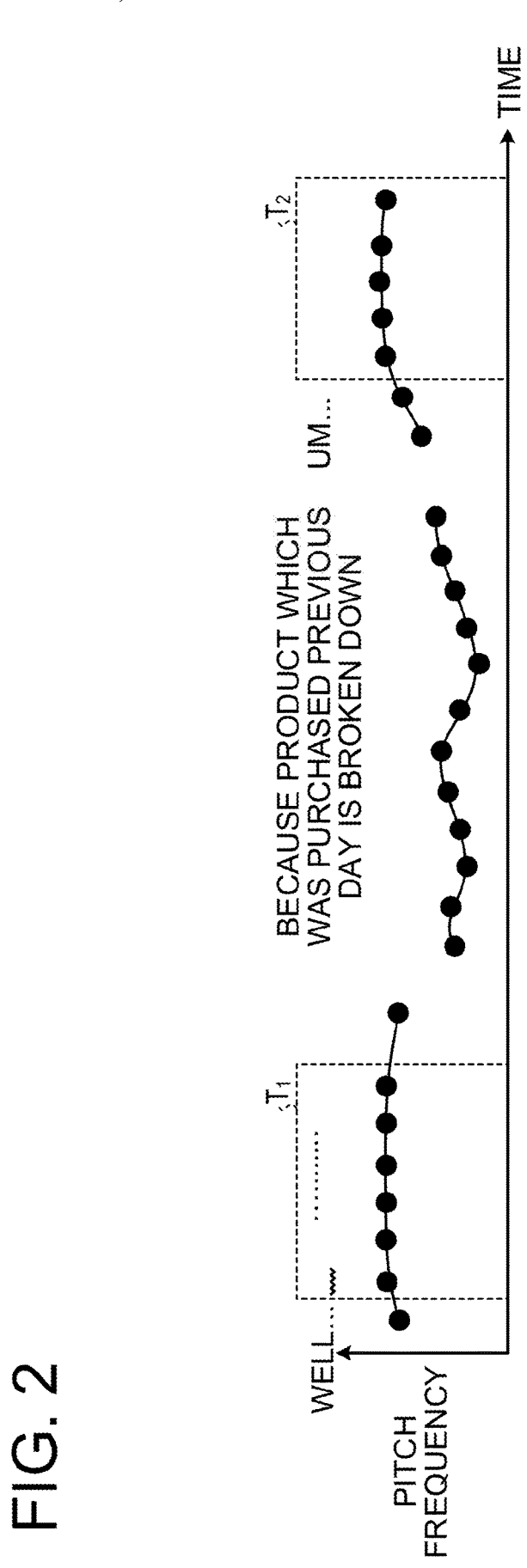
FIG. 2 is a diagram for describing a problem of the reference technique.
Figure 3:
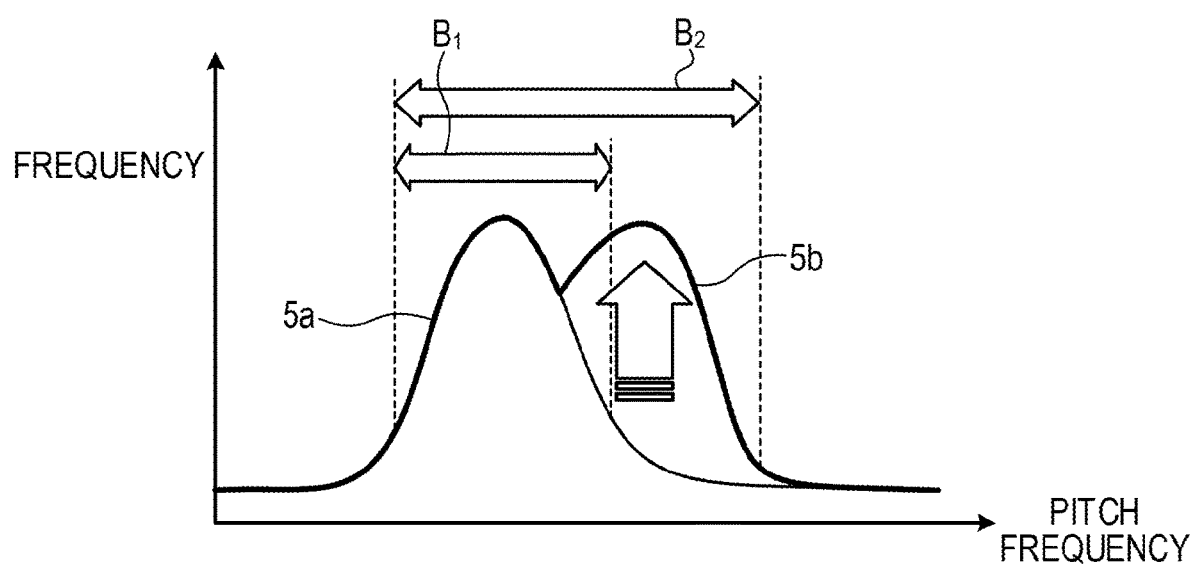
FIG. 3 is a diagram for describing the problem of the reference technique.

Subsequently, the problems of the above-described reference technique will be described. FIGS. 2 and 3 are diagrams for describing the problems of the reference technique. In the reference technique, a speaker sometimes hesitantly speaks and a spread range of the distribution may not be properly specified, so that impression on utterance may not be accurately estimated.

In the graph illustrated in FIG. 2, a horizontal axis is an axis corresponding to time and a vertical axis is an axis corresponding to the pitch frequency. For example, it is assumed that utterance hesitation occurs in time periods $T_1$ and $T_2$. When a speaker hesitantly speaks, since a state in which a height of the voice (pitch frequency) does not change is continued, the frequency for a specific pitch frequency increases and the spread of an original distribution may not be obtained in some cases.

In the graph illustrated in FIG. 3, the horizontal axis is an axis corresponding to the pitch frequency and the vertical axis is an axis corresponding to the frequency. Distribution $5a$ represents a distribution based on a speech signal when there is no utterance hesitation and the spread of distribution $5a$ is range $B_1$. Distribution $5b$ represents the distribution based on the speech signal when there is the utterance hesitation and the spread of distribution $5b$ is range $B_2$. When comparing range $B_1$ and range $B_2$, range $B_2$ is wider. Thus, even when the speaker speaks with the same tone, when the speaking includes hesitation, the voice is likely to be evaluated as bright. Therefore, in the reference technique, there are cases where a dark voice is erroneously determined as a bright voice.

Figure 4:
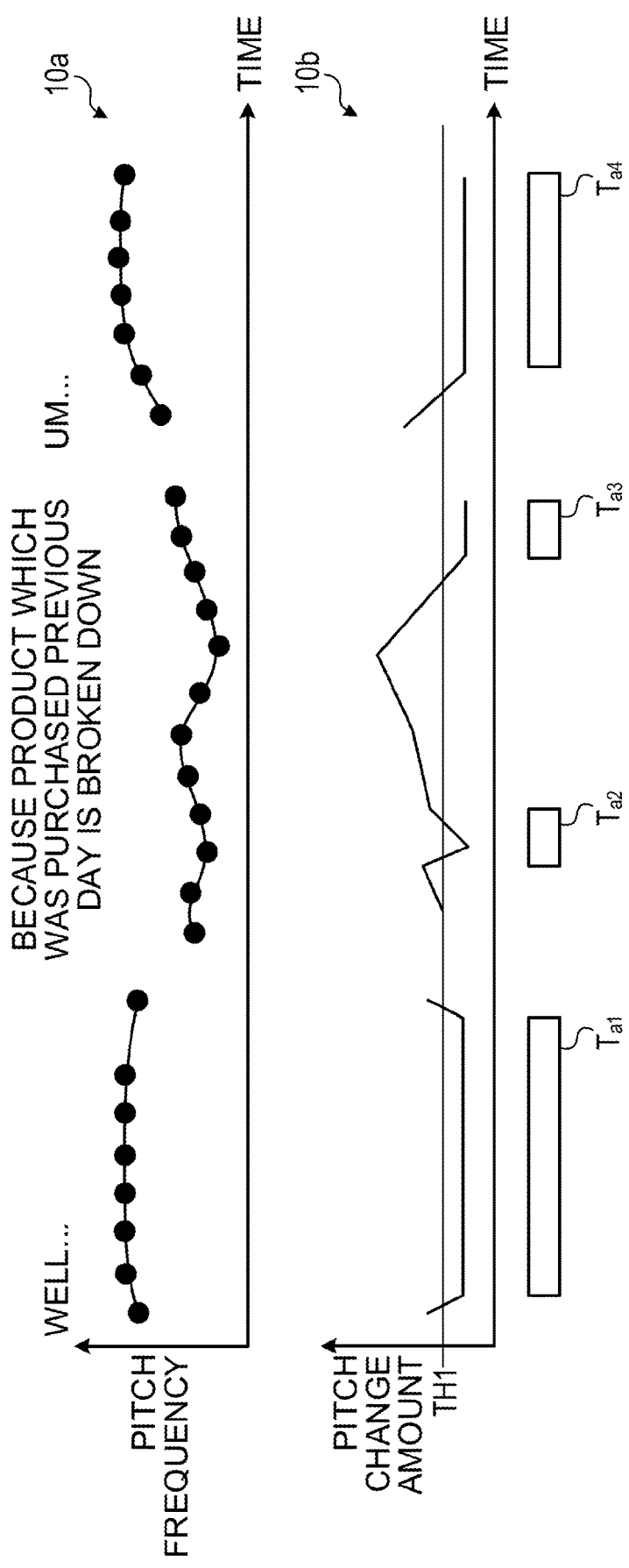
FIG. 4 is a diagram for describing the processing of an audio processing device according to a first embodiment.
Figure 5:
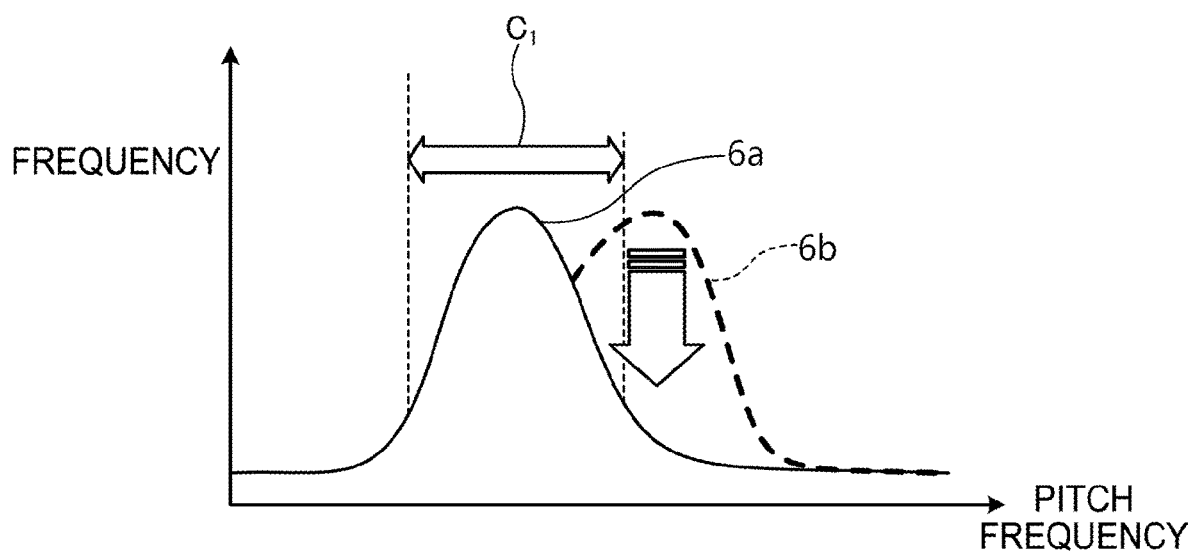
FIG. 5 is a diagram for describing the processing of the audio processing device according to the first embodiment.

Next, descriptions will be made on the processing of the audio processing device according to a first embodiment. FIGS. 4 and 5 are diagrams for describing processing of an audio processing device according to a first embodiment. The audio processing device detects an acoustic feature amount from an audio signal and calculates a statistical amount by reducing the number of times for the acoustic feature amount in a time period in which a time variation amount becomes smaller among respective acoustic feature amounts. In the first embodiment, as an example, descriptions will be made on the assumption that the acoustic feature amount is the pitch frequency.

In graph $10a$ illustrated in FIG. 4, the horizontal axis is an axis corresponding to the time and the vertical axis is an axis corresponding to the pitch frequency. In graph $10b$, the horizontal axis is an axis corresponding to the time and the vertical axis is an axis corresponding to a pitch change amount. For example, the pitch change amount indicates a change amount in the pitch frequency before and after the change. In the example illustrated in FIG. 4, in periods $T_{a1}$, $T_{a2}$, $T_{a3}$, and $T_{a4}$, the pitch change amount is less than a threshold value TH1. The audio processing device specifies each pitch frequency included in periods $T_{a1}$ and $T_{a4}$ of which lengths (duration) are equal to or longer than a predetermined length among the periods $T_{a1}$, $T_{a2}$, $T_{a3}$, and $T_{a4}$. Here, among the pitch frequencies at the respective times, each pitch frequency included in the periods $T_{a1}$ and $T_{a4}$ is denoted as a "first pitch frequency" and each pitch frequency not included in the periods $T_{a1}$ and $T_{a4}$ is referred to as a "second pitch frequency".

The audio processing device generates a graph based on each first pitch frequency and each second pitch frequency. Here, the audio processing device sets the number of times for each first pitch frequency as a first weight coefficient and the number of times for each second pitching frequency as a second weight coefficient. However, the relationship between the first weight coefficient and the second weight coefficient is defined as "first weight factor<second weight factor".

In the graph illustrated in FIG. 5, the horizontal axis is an axis corresponding to the pitch frequency and the vertical axis is an axis corresponding to the frequency. In FIG. 5, distribution $6a$ is a distribution generated by the audio processing device according to the first embodiment and distribution $6b$ is a distribution generated by the reference technique. As illustrated in FIG. 5, it is possible to suppress the spread of the distribution due to utterance hesitation using the first weight coefficient, and, for example, the spread of distribution $6a$ is range $C_1$. Therefore, according to the audio processing device according to the first embodiment, it is possible to accurately estimate the impression concerning the utterance.

Figure 6:
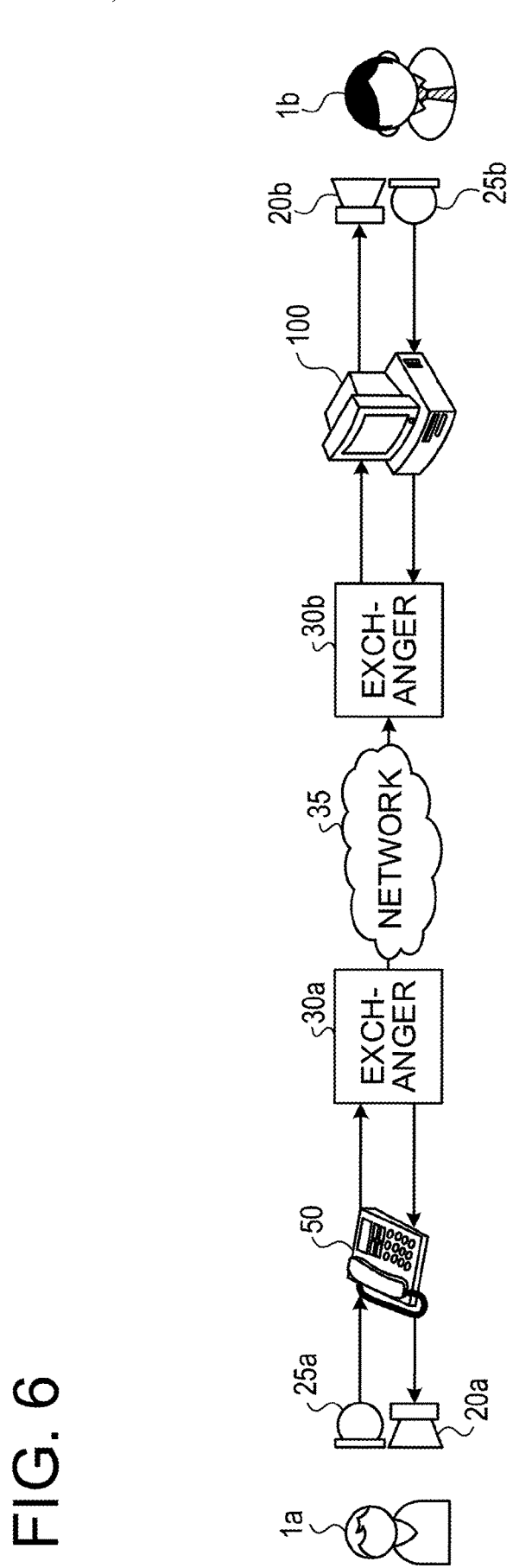
FIG. 6 is a diagram illustrating a configuration of a system according to the first embodiment.

Subsequently, descriptions will be made on an example of a system configuration including the audio processing device according to the first embodiment. FIG. 6 is a diagram illustrating a configuration of a system according to a first embodiment. As illustrated in FIG. 6, the system includes a telephone set 50, exchangers 30a and 30b, and an audio processing device 100. The telephone set 50 is connected to a speaker 20a and a microphone 25a. The audio processing device 100 is connected to a speaker 20b and a microphone 25b.

An exchanger 30a and an exchanger 30b are connected to each other via a network 35. The exchanger 30a and the exchanger 30b are devices that relay audio signals transmitted from the telephone set 50 or the audio processing device 100.

The telephone set 50 acquires the audio signal of the speaker 1a via the microphone 25a. The telephone set 50 transmits the acquired audio signal of the speaker 1a to the audio processing device 100. The audio signal transmitted to the audio processing device 100 is output by the speaker 20b.

The audio processing device 100 has a call function in addition to the function of evaluating the utterance described above. The audio processing device 100 acquires the audio signal of the speaker 1a via the microphone 25b. The audio processing device 100 transmits the acquired audio signal of the speaker 1a to the telephone set 50. The audio signal transmitted to the telephone set 50 is output by the speaker 20a.

Figure 7:
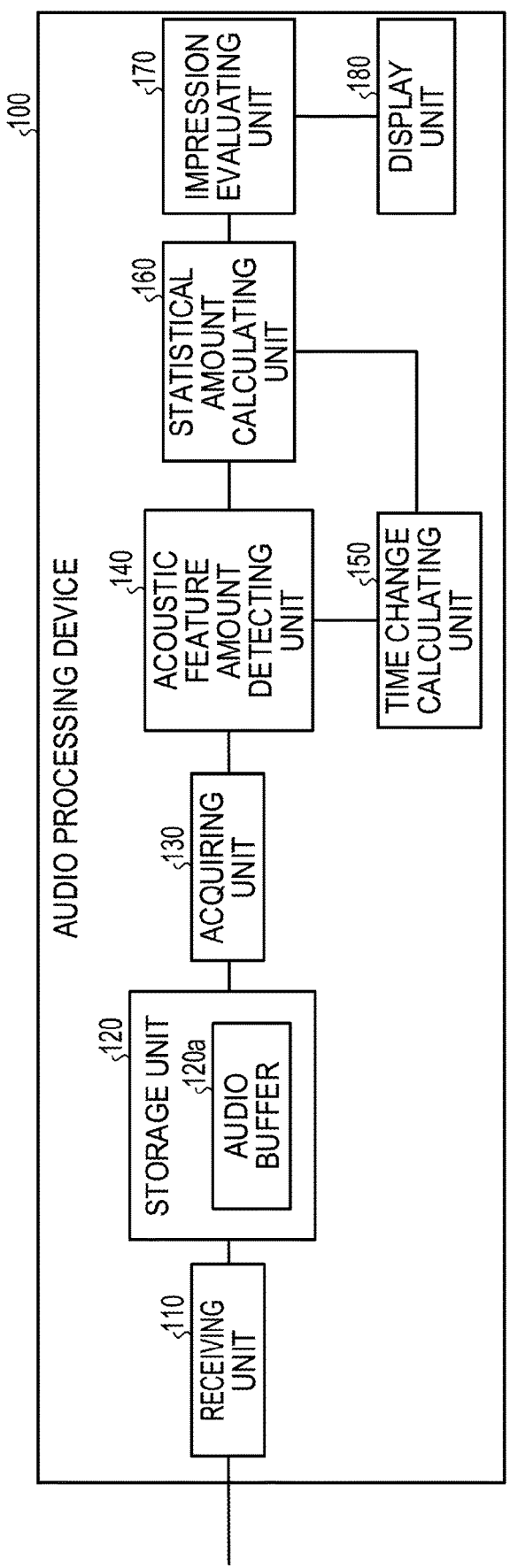
FIG. 7 is a functional block diagram illustrating a configuration of the audio processing device according to the first embodiment.

Subsequently, descriptions will be made on an example of the configuration of the audio processing device 100 according to the first embodiment. FIG. 7 is a functional block diagram illustrating a configuration of an audio processing device according to a first embodiment. As illustrated in FIG. 7, the audio processing device includes a receiving unit 110, a storage unit 120, an acquiring unit 130, an acoustic feature amount detecting unit 140, a time change calculating unit 150, a statistical amount calculating unit 160, an impression evaluating unit 170, and a display unit 180. Further, although the audio processing device 100 has the call function as described with reference to FIG. 6, the call function is similar to a known call function, and thus, the description thereof will be omitted.

The receiving unit 110 is a processing unit that receives the audio signal of the speaker 1a from the telephone set 50. The receiving unit 110 records the received voice signal in an audio buffer 120a of the storage unit 120.

The storage unit 120 has the audio buffer 120a. The storage unit 120 corresponds to a semiconductor memory device such as a random access memory (RAM), a read only memory (ROM), or a flash memory, or a storage device such as a hard disk drive (HDD).

The audio buffer 120a is a buffer that holds the audio signal of the speaker 1a. For example, it is assumed that the audio signal is information in which a plurality of audio frames for each predetermined period is arranged in time series. The audio frame is information in which the time and a magnitude of the audio signals in a predetermined period correspond to each other.

The acquiring unit 130 is a processing unit that acquires the audio signal from the audio buffer 120a. The acquiring unit 130 outputs the acquired audio signal to the acoustic feature amount detecting unit 140.

The acoustic feature amount detecting unit 140 is a processing unit that detects the pitch frequency by performing a frequency analysis of each audio frame included in the audio signal. The pitch frequency is an example of the acoustic feature amount. The acoustic feature amount detecting unit 140 outputs information on the pitch frequency to the time change calculating unit 150 and the statistical amount calculating unit 160. For example, the pitch frequency detected from an n-th audio frame is denoted as p(n).

For example, the acoustic feature amount detecting unit 140 may detect the pitch frequency based on a literature (D. Talkin, "A Robust Algorithm for Pitch Tracking (RAPT)," in Speech Coding & Synthesis, W. B. Kleijn and K. K. Pailwal (Eds.), Elsevier, pp. 495-518, 1995).

The time change calculating unit 150 is a processing unit that calculates the time change of the pitch frequency. Based on the calculation result of the time change, the time change calculating unit 150 specifies a period in which the change amount of the pitch frequency is less than the threshold value TH1. The time change calculating unit 150 outputs information of the specified period to the statistical amount calculating unit 160. Hereinafter, descriptions will be made on an example of the processing of the time change calculating unit 150.

The time change calculating unit 150 calculates a difference $\Delta p(n)$ between a pitch frequency $p(n-1)$ of an (n−1)-th audio frame and a pitch frequency $p(n)$ of the n-th audio frame based on Equation (1).

$$\Delta p(n) = |p(n) - p(n-1)| \tag{1}$$

When the difference $\Delta p(n)$ in the pitch frequency satisfies condition 1, the time change calculating unit 150 specifies the corresponding audio frame as "start frame Ts" in the period (section in which the change amount in the pitch frequency is less than the threshold value TH1). The threshold value TH1 included in condition 1 is, for example, 20 Hz.

$$\{\Delta p(n-1) > TH1\} \wedge \{\Delta p(n) \leq TH1\} \tag{CONDITION1}$$

After specifying the start frame Ts of the period, the time change calculating unit 150 determines whether the difference $\Delta p(n)$ in the pitch frequency of the audio frame satisfies condition 2 with respect to the start frame Ts and after the subsequent frames. When the difference $\Delta p(n)$ in the pitch frequency satisfies condition 2, the time change calculating unit 150 specifies the corresponding audio frame as "end frame T". For example, when the audio frame satisfying condition 2 is the n-th audio frame, the time change calculating unit 150 sets the end frame Te as the (n−1)-th audio frame.

$$\{\Delta p(n-1) \leq TH1\} \wedge \{\Delta p(n) > TH1\} \tag{CONDITION2}$$

After specifying the end frame Te, the time change calculating unit 150 repeatedly executes the processing of specifying the start frame Ts and the end frame Te again to specify each period in which the change amount of the pitch frequency is less than the threshold value TH1.

The statistical amount calculating unit 160 is a processing unit that calculates the statistical amount of the acoustic feature amount based on the information of the period in which the change amount of the pitch frequency is less than the threshold value TH1 and the acoustic feature amount (pitch frequency). Hereinafter, descriptions will be made on an example of the processing of the statistical amount calculating unit 160.

Based on a length of the period, the statistical amount calculating unit 160 specifies the weight coefficient of the pitch frequency corresponding to each period. For example, the statistical amount calculating unit 160 specifies the weight coefficient using the relationship illustrated in FIG. 8. In generating the graph, this weight coefficient has a value corresponding to the number of times for the pitch frequency of the corresponding period.

Figure 8:
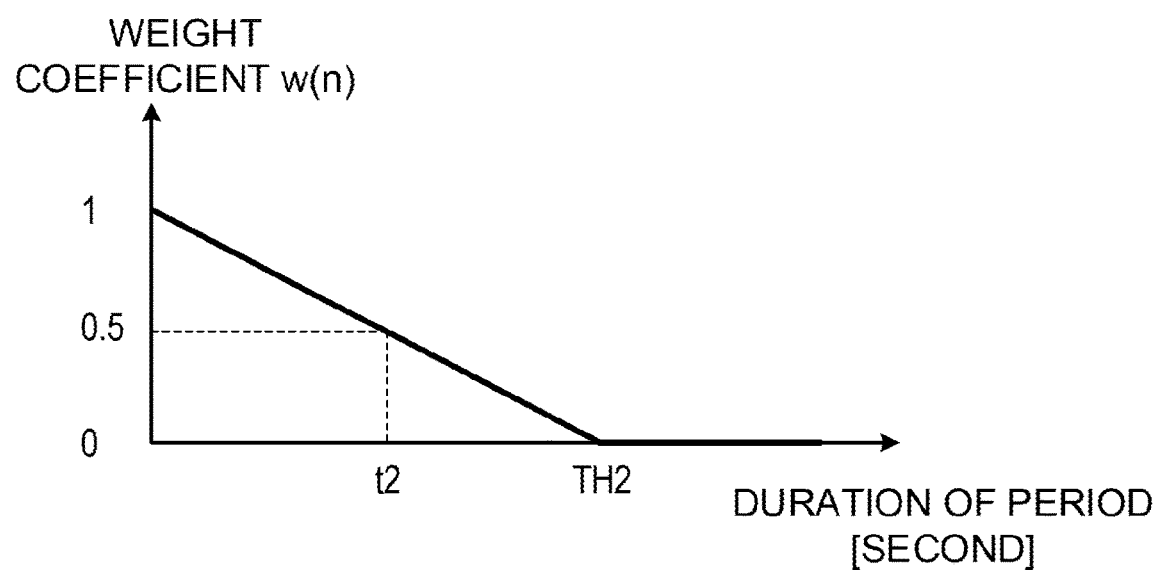
FIG. 8 is diagram illustrating a relationship between a duration of a section and a weight coefficient.

FIG. 8 is diagram 1 illustrating a relationship between a duration of a period and a weight coefficient. In FIG. 8, a horizontal axis is an axis corresponding to the duration of the period and a vertical axis is the axis corresponding to a weight coefficient w(n). For example, as the duration of the period becomes longer, a value of the weight coefficient w(n) decreases. For example, in the case of a duration $t_2$ of a predetermined period $Z_1$, the value of the weight coefficient w(n) is "0.5". That is, the statistical amount calculating unit 160 sets the number of times of each pitch frequency detected in period $Z_1$ to "0.5".

When the duration of the period is equal to or larger than a threshold value TH2, the weight coefficient w(n) is "0". For example, in the case where a duration $t_2$ of a predetermined period $Z_2$ is equal to or larger than the threshold value TH2, the value of the weight coefficient w(n) is "0". For example, the threshold value TH2 is set to "0.4 seconds". That is, the statistical amount calculating unit 160 sets the number of times of each pitch frequency detected in period $Z_2$ to "0" and excludes each pitch frequency detected in period $Z_2$.

The statistical amount calculating unit 160 compares the duration of each period with the relationship illustrated in FIG. 8 and specifies the weight coefficient w(n) of the pitch frequency corresponding to each period.

The statistical amount calculating unit 160 generates a graph based on each pitch frequency extracted from a plurality of audio frames within a predetermined time. The graph generated by the statistical amount calculating unit 160 is the graph described with reference to FIG. 5 in which the horizontal axis represents the pitch frequency and the vertical axis represents the frequency. The statistical amount calculating unit 160 calculates the frequency of the pitch frequency by integrating each frequency associated with the same pitch frequency.

For example, it is assumed that 10 same pitch frequencies are detected with respect to a pitch frequency f[Hz] (assuming that the pitch frequency f[Hz] is detected from ten different audio frames). Among the detected pitch frequencies, when there are three pitch frequencies of the number of times of "1", three pitch frequencies of the number of times of "0.5", and four pitch frequencies of the number of times of "0", the frequency corresponding to the pitch frequency f[Hz] on the horizontal axis is "1×3+0.5×3+0×4=4.5" regarding the graph of FIG. 5. Further, when generating the graph, the statistical amount calculating unit 160 may perform normalization based on the known technique.

After generating the graph, the statistical amount calculating unit 160 calculates the spread of the graph. For example, the statistical amount calculating unit 160 refers to the graph and calculates a portion where the frequency is equal to or higher than a predetermined frequency as the spread of the graph. The statistical amount calculating unit 160 outputs the spread of the graph to the impression evaluating unit 170 as information on a statistical amount.

The impression evaluating unit 170 is a processing unit that evaluates the impression of the audio signal (utterance) based on the information on the statistical amount. The impression evaluating unit 170 displays an evaluation result on the display unit 180.

For example, the impression evaluating unit 170 previously holds the spread of the graph at the normal time. The impression evaluating unit 170 evaluates that "the impression is good" when the spread contained in the information of the statistical amount is wider than the spread of the graph at the normal time. The impression evaluating unit 170 evaluates that the impression is "normal" when the spread of the graph at the normal time is equal to the spread included in the information of the statistical amount. The impression evaluating unit 170 evaluates that "the impression is bad" when the spread contained in the information of the statistical amount is narrower than the spread of the graph at the normal time.

The display unit 180 is a display device that displays the evaluation result of the impression evaluating unit 170. For example, the display unit 180 corresponds to a liquid crystal display, a touch panel, or the like.

Figure 9A:
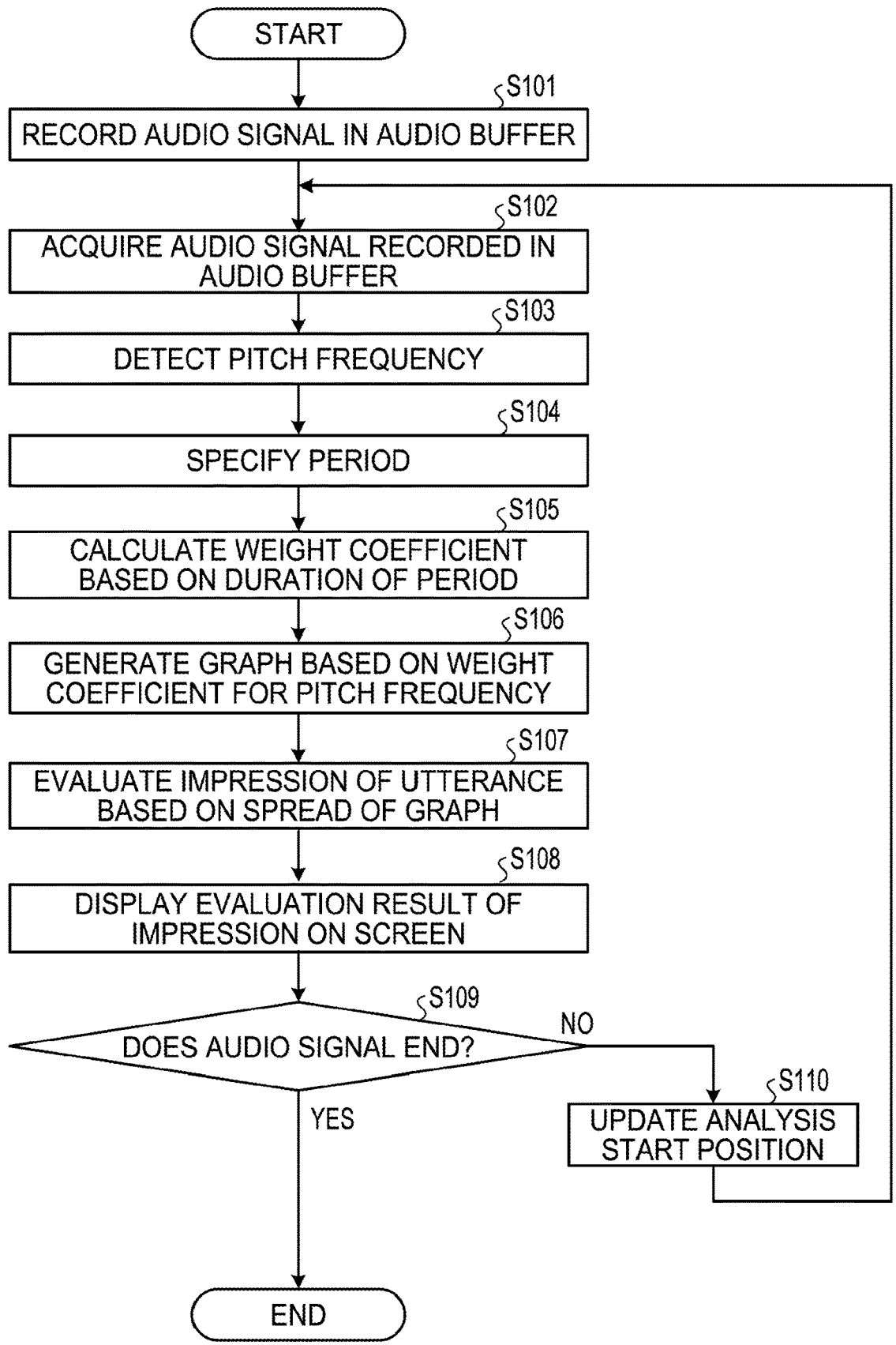
FIG. 9A is a flowchart illustrating a processing order of an audio processing device according to the first embodiment.

Next, descriptions will be made on an example of a processing order of the audio processing device according to the first embodiment. FIG. 9A is a flowchart illustrating a processing order of the audio processing device according to the first embodiment. As illustrated in FIG. 9A, the receiving unit 110 of the audio processing device 100 records the audio signal in the audio buffer 120a (operation S101).

The acquiring unit 130 of the audio processing device 100 acquires the audio signal recorded in the audio buffer 120a (operation S102). The acoustic feature amount detecting unit 140 of the audio processing device 100 detects the pitch frequency from the audio signal (operation S103).

The time change calculating unit 150 of the audio processing device 100 specifies a period in which the change amount is less than the threshold value TH1 based on each pitch frequency (operation S104). The statistical amount calculating unit 160 of the audio processing device 100 calculates the weight coefficient based on the duration of the period (operation S105).

The statistical amount calculating unit 160 generates the graph based on the weight coefficient corresponding to the pitch frequency (operation S106). The impression evaluating unit 170 of the audio processing device 100 evaluates the impression of the utterance based on the spread of the graph (operation S107).

The impression evaluating unit 170 displays the evaluation result of the impression on the display unit 180 (operation S108). When the audio signal ends ("Yes" in operation S109), the audio processing device 100 ends the processing. In the meantime, when the audio signal does not end ("No" in operation S109), the audio processing device 100 updates an analysis start position (operation S110) and proceeds to operation S102.

Next, descriptions will be made on an effect of the audio processing device 100 according to the first embodiment. The audio processing device 100 specifies a period in which a pitch change amount is less than a threshold value TH1 and sets the number of times corresponding to the pitch frequency detected in the period to be smaller than the number of times for the pitch frequency detected in the other period, and calculates a graph (frequency distribution). As a result, since the spread of the graph may be suppressed due to the utterance hesitation, the impression on the utterance may be accurately estimated.

Although the audio processing device 100 according to the first embodiment has been described using the spread of the graph of the acoustic feature amount (frequency distribution) as the statistical amount, the audio processing device 100 is not limited thereto. For example, the audio processing device 100 may use, as a statistical value, one or more of the spread, an average value, a minimum value, and a maximum value of the graph. Further, although the audio processing device 100 according to the first embodiment has been described using the pitch frequency as the acoustic feature amounts of the time change calculating unit 150 and the statistical amount calculating unit 160, the audio processing device 100 may be configured such that, in the acoustic feature amount detecting unit 140, a plurality of acoustic feature amounts except for the pitch frequency may be detected and different acoustic feature amounts may be used by the time change calculating unit 150 and the statistical amount calculating unit 160.

Figure 9B:
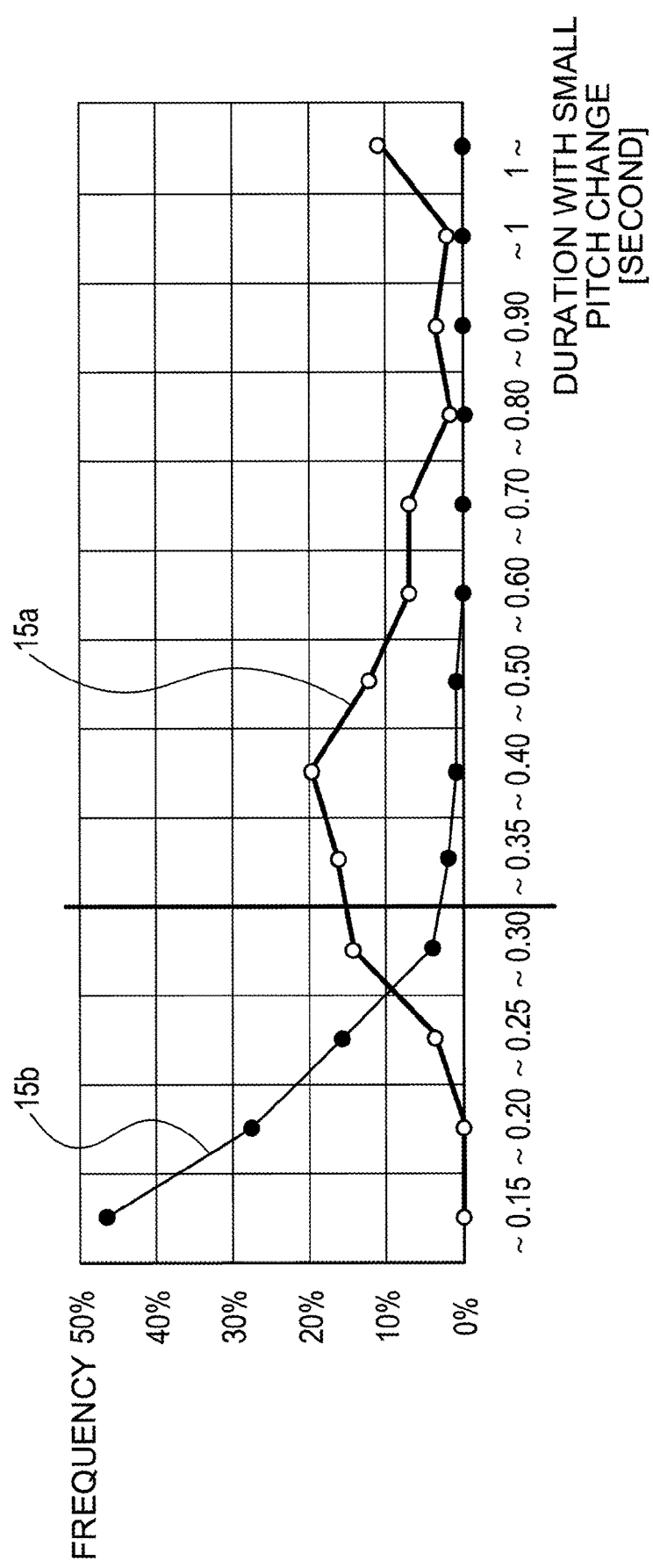
FIG. 9B is a diagram illustrating an example of a distribution of a duration with a small change amount of a pitch frequency.

An investigation result of the distribution of the duration with a small change amount of the pitch frequency will be described with respect to utterance with utterance hesitation and other utterances. FIG. 9B is a diagram illustrating an example of the distribution of the duration with the small change amount of the pitch frequency. The horizontal axis of FIG. 9B is an axis corresponding to the duration of the change amount of the pitch frequency and the vertical axis is an axis corresponding to the frequency. A line segment 15a is a line segment corresponding to the utterance with the utterance hesitation. A line segment 15b is a line segment corresponding to the other utterances. In the case where there is the utterance hesitation, a majority (82%) is distributed in approximately 0.3 seconds or more and in the absence of the utterance hesitation, a majority (95%) is distributed in less than approximately 0.3 seconds. That is, it may be seen that specifying an utterance hesitation interval based on the duration with the small change amount of the pitch frequency is effective.

Second Embodiment

Figure 10:
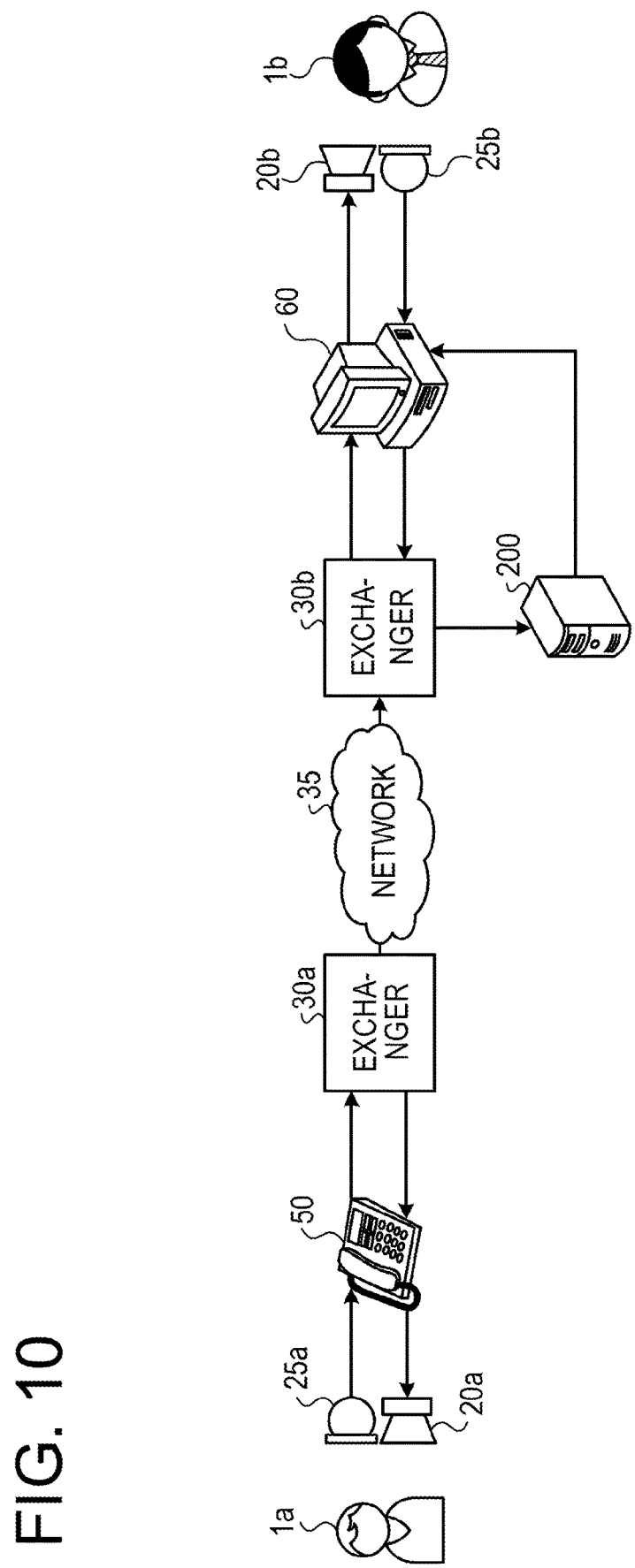
FIG. 10 is a diagram illustrating a configuration of a system according to a second embodiment.

FIG. 10 is a diagram illustrating a configuration of a system according to a second embodiment. As illustrated in FIG. 10, the system includes the telephone set 50, the exchangers 30a and 30b, an operator terminal 60, and an audio processing device 200. The telephone set 50 is connected to the speaker 20a and the microphone 25a. The operator terminal 60 is connected to the speaker 20b and the microphone 25b.

The exchanger 30a and the exchanger 30b are connected to each other via the network 35. The exchanger 30a and the exchanger 30b are devices that relay audio signals transmitted from the telephone set 50 or the audio processing device 200. For example, the exchanger 30b transmits the audio signal transmitted from the telephone set 50 to the audio processing device 200.

The telephone set 50 acquires the audio signal of the speaker 1a via the microphone 25a. The telephone set 50 transmits the acquired audio signal of the speaker 1a to the audio processing device 200. The audio signal transmitted to the audio processing device 200 is output by the speaker 20b.

The operator terminal 60 acquires the audio signal of the speaker 1a via the microphone 25b. The operator terminal 60 transmits the acquired audio signal of the speaker 1a to the telephone set 50. The audio signal transmitted to the telephone set 50 is output by the speaker 20a.

Figure 11:
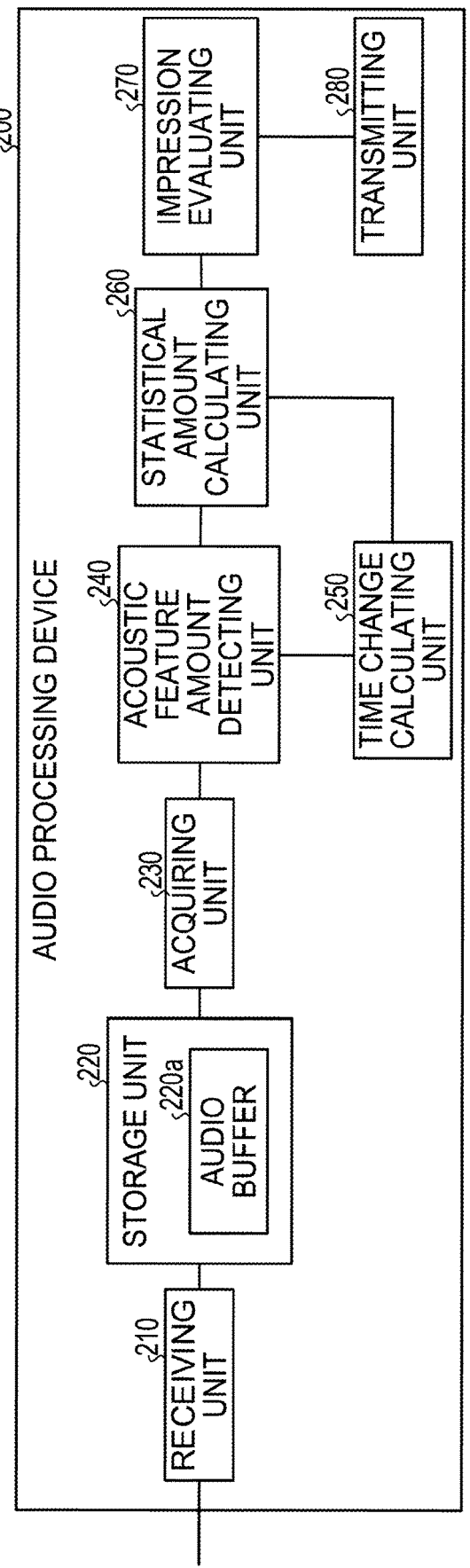
FIG. 11 is a functional block diagram illustrating a configuration of an audio processing device according to the second embodiment.

The audio processing device 200 is a device that receives the audio signal from the exchanger 30b and evaluates the impression of the utterance. FIG. 11 is a functional block diagram illustrating a configuration of an audio processing device according to a second embodiment. As illustrated in FIG. 11, the audio processing device 200 includes a receiving unit 210, a storage unit 220, an acquiring unit 230, an acoustic feature amount detecting unit 240, a time change calculating unit 250, a statistical amount calculating unit 260, an impression evaluating unit 270, and a transmitting unit 280.

The receiving unit 210 is a processing unit that receives the audio signal of the speaker 1a from the telephone set 50. The receiving unit 210 records the received voice signal in an audio buffer 220a of the storage unit 220.

The storage unit 220 has an audio buffer 220a. The storage unit 220 corresponds to the semiconductor memory element such as the RAM, the ROM, or the flash memory, or the storage device such as the HDD.

The audio buffer 220a is a buffer that holds the audio signal of the speaker 1a. For example, it is assumed that the audio signal is information in which a plurality of audio frames for each predetermined period is arranged in time series. The audio frame is information in which the time and the magnitude of the audio signals in a predetermined period correspond to each other.

The acquiring unit 230 is a processing unit that acquires the audio signal from the audio buffer 220a. The acquiring unit 230 outputs the acquired audio signal to the acoustic feature amount detecting unit 240.

The acoustic feature amount detecting unit 240 is a processing unit that detects power from each audio frame included in the audio signal. The power is an example of the acoustic feature amount. The acoustic feature amount detecting unit 240 outputs information on the power to the time change calculating unit 250 and the statistical amount calculating unit 260.

For example, the acoustic feature amount detecting unit 240 detects power S(n) from the audio frame based on Equation (2). In Equation (2), C(t) represents a value of the audio signal at time t. n represents a frame number of the audio frame. M represents a time length of one audio frame. For example, the time length of one audio frame is set to 20 ms.

$$S(n) = 10\log_{10}\left(\sum_{t=n*M}^{(n+1)*M-1} C(t)^2\right) \quad (2)$$

The time change calculating unit 250 is a processing unit that calculates a variance of the power of the audio frame and specifies a period in which the variance is less than a threshold value TH3. The time change calculating unit 250 outputs information of the specified period to the statistical amount calculating unit 260. Hereinafter, descriptions will be made on an example of the processing of the time change calculating unit 250.

For example, the time change calculating unit 250 calculates a variance S_var(n) based on powers S(n), S(n+1), . . . , S(n+m) of the respective audio frames included in the predetermined period.

When an (n−1)-th variance S_var(n−1) and an n-th variance S_var(n) satisfy condition 3, the time change calculating unit 250 specifies the corresponding audio frame (n-th audio frame) as the "start frame Ts" of the period (period in which the variance is less than the threshold value TH3).

$$\{S\_var(n-1) > TH3\} \land \{S\_var(n) \leq TH3\} \quad (\text{CONDITION3})$$

When the (n−1)-th variance and the n-th variance S_var(n) satisfy condition 4 with respect to the start frame Ts after specifying the start frame Ts of the period, the time change calculating unit 250 specifies the corresponding audio frame ((n−1)-th audio frame) as "end frame Te".

$$\{S\_var(n-1) \leq TH3\} \land \{S\_var(n) > TH3\} \quad (\text{CONDITION4})$$

After specifying the end frame Te, the time change calculating unit 250 repeatedly executes the processing of specifying the start frame Ts and the end frame Te again to specify each period in which the variance is less than the threshold value TH3.

The statistical amount calculating unit 260 is a processing unit that calculates the statistical amount of the acoustic feature amount based on the information of the period in which the variance is less than the threshold value TH3 and the acoustic feature amount (power). Hereinafter, descriptions will be made on an example of the processing of the statistical amount calculating unit 260.

Based on the length of the period, the statistical amount calculating unit 260 specifies the weight coefficient of the power of the audio frame included in each period. For example, the statistical amount calculating unit 260 specifies the weight coefficient using the relationship illustrated in FIG. 12. In generating the graph, this weight coefficient has a value corresponding to the number of times for the power of the corresponding period.

Figure 12:
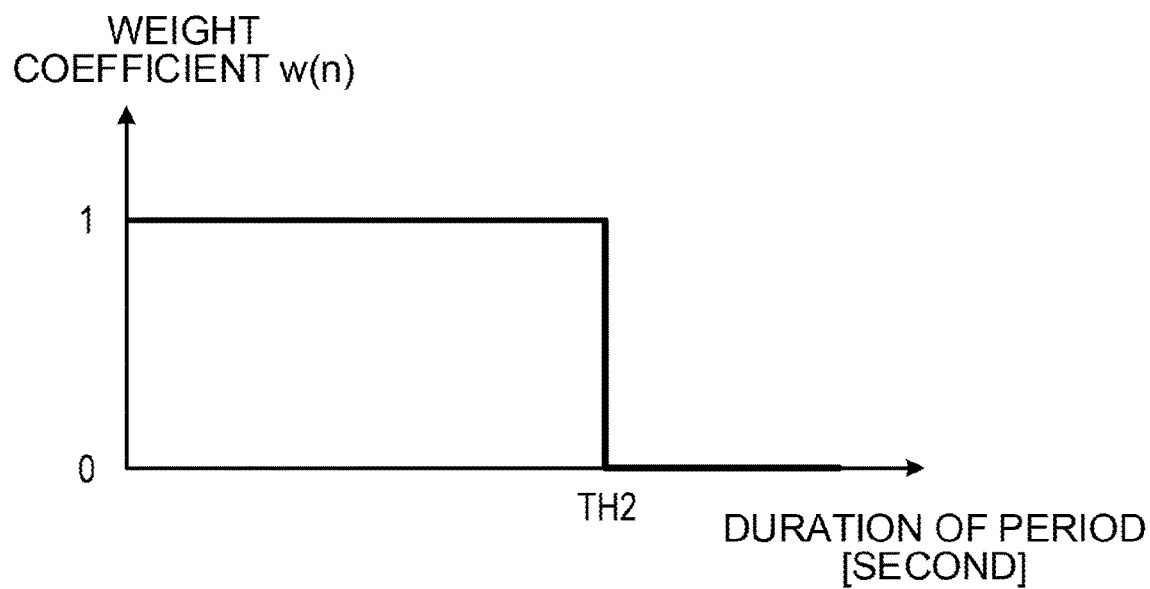
FIG. 12 is a diagram illustrating a relationship between a duration of a section and a weight coefficient.

FIG. 12 is a diagram illustrating a relationship between a duration of a section and a weight coefficient. In FIG. 12, a horizontal axis is an axis corresponding to the duration of the period and a vertical axis is an axis corresponding to a weight coefficient w(n). For example, in the case where the duration of the period is less than a threshold value TH2, the value of the weight coefficient w(n) is "1". In the case where the duration of the period is equal to or more than the threshold value TH2, the value of the weight coefficient w(n) is "0".

The statistical amount calculating unit 260 compares the duration of each period with the relationship illustrated in FIG. 12 and specifies the weight coefficient w(n) of the power corresponding to each period. Further, the statistical amount calculating unit 260 may specify the weight coefficient w(n) of the power corresponding to each period based on the relationship between the duration of the period and the weight coefficient w(n) illustrated in FIG. 8.

Figure 13:
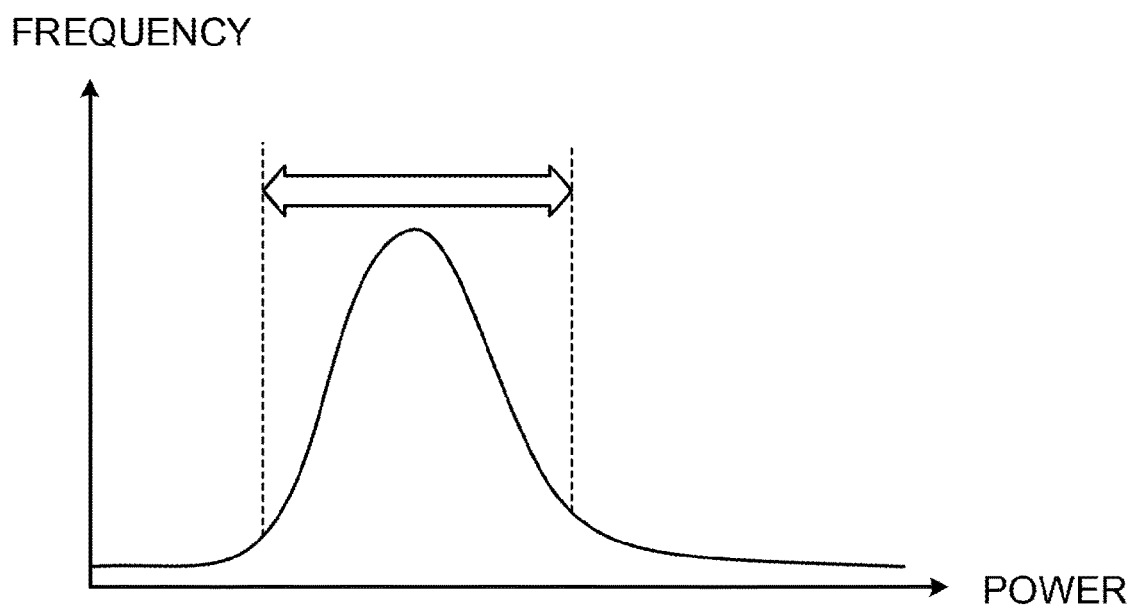
FIG. 13 is a diagram illustrating an example of a graph generated by a statistical amount calculating unit according to the second embodiment.

The statistical amount calculating unit 260 generates the graph based on each power extracted from a plurality of audio frames within a predetermined time. FIG. 13 is a diagram illustrating an example of a graph generated by a statistical amount calculating unit according to a second embodiment. In FIG. 13, a horizontal axis is an axis corresponding to the power and a vertical axis is an axis corresponding to the frequency. The statistical amount calculating unit 260 calculates the frequency of the pitch frequency by integrating each number of times associated with the same power.

For example, with respect to a predetermined power P[W], ten same powers are detected and among the detected powers, when there are three powers of the number of times of "1", three powers of the number of times of "0.5", and four powers of the number of times of "0", the frequency corresponding to the power P[W] on the horizontal axis is "1×3+0.5×3+0×4=4.5" regarding the graph of FIG. 13. Further, when generating the graph, the statistical amount calculating unit 260 may perform normalization based on the known technique.

After generating the graph, the statistical amount calculating unit 260 calculates the spread of the graph. For example, the statistical amount calculating unit 260 refers to the graph and calculates a portion where the frequency is equal to or higher than a predetermined frequency as the spread of the graph. The statistical amount calculating unit 260 outputs the spread of the graph to the impression evaluating unit 270 as information on the statistical amount.

The impression evaluating unit 270 is a processing unit that evaluates the impression of the audio signal (utterance) based on the information on the statistical amount. The impression evaluating unit 270 outputs the evaluation result to the transmitting unit 280. The impression evaluating unit 270 evaluates the impression in the same manner as the impression evaluating unit 170 described in the first embodiment.

The transmitting unit 280 is a processing unit that transmits information of the evaluation result received from the impression evaluating unit 270 to the operator terminal 60.

Figure 14:
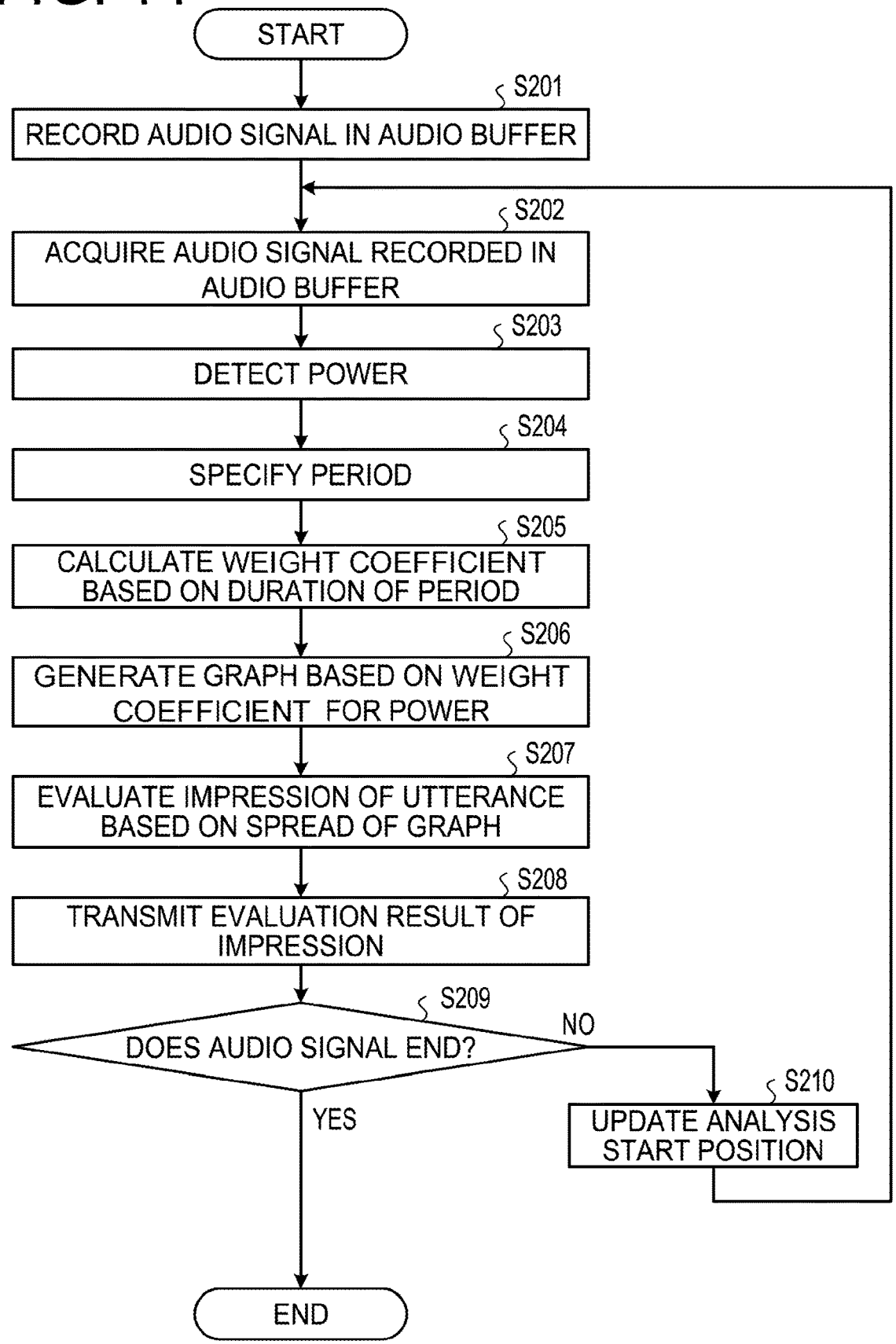
FIG. 14 is a flowchart illustrating a processing order of an audio processing device according to the second embodiment.

Next, descriptions will be made on an example of the processing order of the audio processing device according to a second embodiment. FIG. 14 is a flowchart illustrating a processing order of an audio processing device according to the second embodiment. As illustrated in FIG. 14, the receiving unit 210 of the audio processing device 200 records the audio signal in the audio buffer 220a (operation S201).

The acquiring unit 230 of the audio processing device 200 acquires the audio signal recorded in the audio buffer 220a (operation S202). The acoustic feature amount detecting unit 240 of the audio processing device 200 detects the power from the audio signal (operation S203).

The time change calculating unit 250 of the audio processing device 200 specifies a period in which the variance is less than a threshold value TH3 based on the variance of each power (operation S204). The statistical amount calculating unit 260 of the audio processing device 200 calculates the weight coefficient based on the duration of the period (operation S205).

The statistical amount calculating unit 260 generates the graph based on the weight coefficient corresponding to the power (operation S206). The impression evaluating unit 270 of the audio processing device 200 evaluates the impression of the utterance based on the spread of the graph (operation S207).

The impression evaluating unit 270 transmits the evaluation result of the impression to the operator terminal 60 (operation S208). When the audio signal ends ("Yes" in operation S209), the audio processing device 200 ends the processing. In the meantime, when the audio signal does not end ("No" in operation S209), the audio processing device 200 updates the analysis start position (operation S210) and proceeds to operation S202.

Next, descriptions will be made on the effect of the audio processing device 200 according to the second embodiment. The audio processing device 200 specifies a period in which the variance is less than the threshold value TH3 and sets the number of times corresponding to the power of the audio frame detected in the period to be smaller than the number of times for the power of the audio frame detected in the other period, and calculates the graph (frequency distribution). As a result, since the spread of the graph may be suppressed due to the utterance hesitation, the impression on the utterance may be accurately estimated.

Third Embodiment

Figure 15:
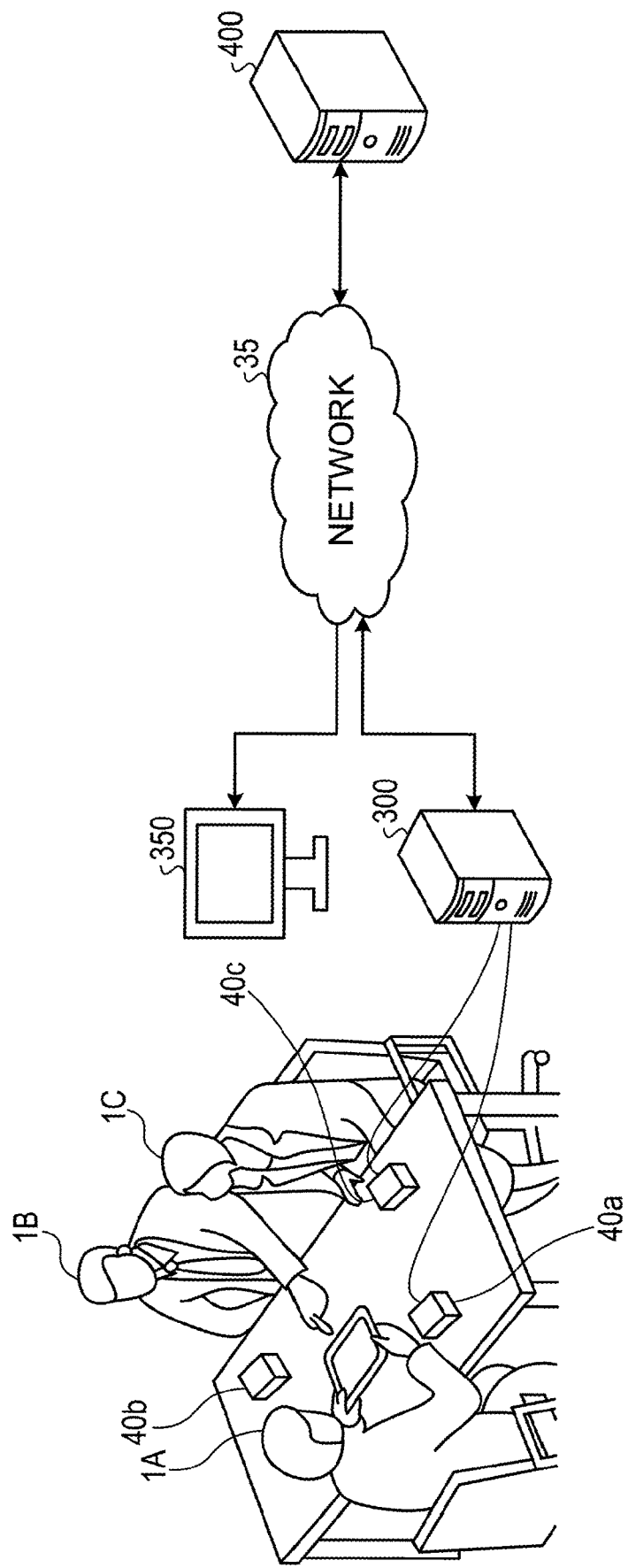
FIG. 15 is a diagram illustrating a configuration of a system according to a third embodiment.

FIG. 15 is a diagram illustrating a configuration of a system according to a third embodiment. As illustrated in FIG. 15, the system includes microphones 40a, 40b, and 40c, a recording device 300, a display device 350, and an audio processing device 400. The recording device 300 is connected to the audio processing device 400 via the network 35. Although not illustrated, the audio processing device 400 may be constituted by a single server or a plurality of servers on a cloud.

An audio by speaker 1A is collected by the microphone 40a and the collected audio signal is output to the recording device 300. An audio by speaker 1B is collected by the microphone 40b and the collected audio signal is output to the recording device 300. An audio by speaker 1C is collected by the microphone 40c and the collected audio signal is output to the recording device 300.

In the following description, in particular when distinguishing, the audio signal of speaker 1A is expressed as "first audio signal". The audio signal of speaker 1B is expressed as a "second audio signal". The audio signal of speaker 1C is expressed as a "third audio signal".

For example, speaker information of speaker 1A is given to the first audio signal. The speaker information is information for uniquely identifying the speaker. Speaker information of speaker 1B is given to the second audio signal. Speaker information of speaker 1C is given to the third audio signal.

The recording device 300 is a device that records the first audio signal, the second audio signal, and the third audio signal. Further, the recording device 300 transmits the first audio signal, the second audio signal, and the third audio signal to the audio processing device 400.

Figure 16:
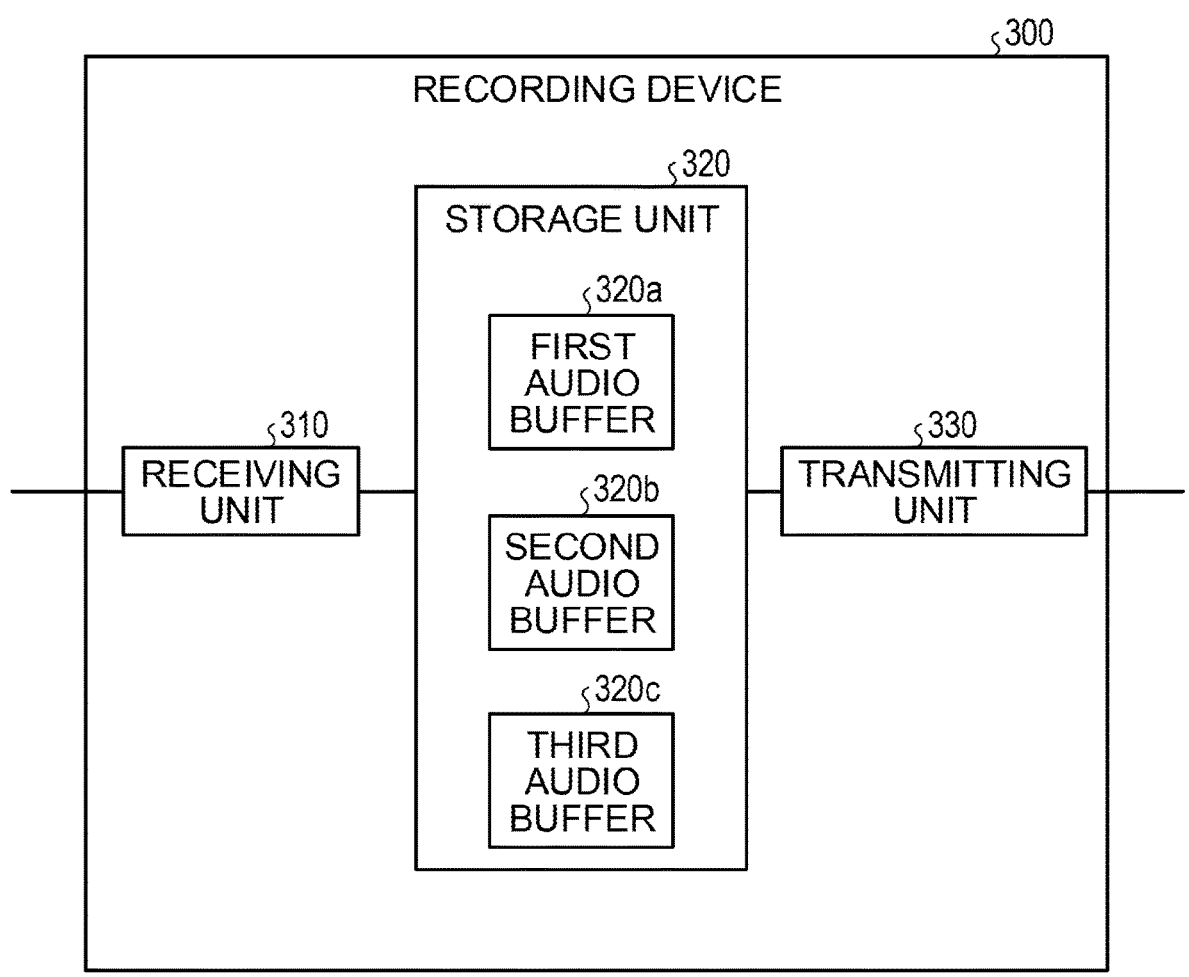
FIG. 16 is a functional block diagram illustrating a configuration of a recording device according to the third embodiment.

FIG. 16 is a functional block diagram illustrating a configuration of a recording device according to a third embodiment. As illustrated in FIG. 16, the recording device 300 includes a receiving unit 310, a storage unit 320, and a transmitting unit 330.

The accepting unit 310 is a processing unit that receives the first to third audio signals from the microphones 40a, 40b, and 40c. The receiving unit 310 records the first audio signal in a first audio buffer 320a. The receiving unit 310 records the second audio signal in a second audio buffer 320b. The receiving unit 310 records the third audio signal in a third audio buffer 320c.

The storage unit 320 includes the first audio buffer 320a, the second audio buffer 320b, and the third audio buffer 320c. The storage unit 320 corresponds to the semiconductor memory element such as the RAM, the ROM, or the flash memory, or the storage device such as the HDD.

The first audio buffer 320a holds the first audio signal. The second audio buffer 320b holds the second audio signal. The third audio buffer 320c holds the third audio signal.

The transmitting unit 330 is a processing unit that transmits the first audio signal of the first audio buffer 320a, the second audio signal of the second audio buffer 320b, and the third audio signal of the third audio buffer 320c to the audio processing device 400. The transmitting unit 330 may transmit the first to third audio signals to the audio processing device 400 collectively or separately.

The display device 350 is connected to the audio processing device 400 via the network 35. The display device 350 corresponds to a liquid crystal display or the like. The display device 350 receives and displays the evaluation result of the impression of the utterance of speakers 1A to 1C from the audio processing device 400.

Figure 17:
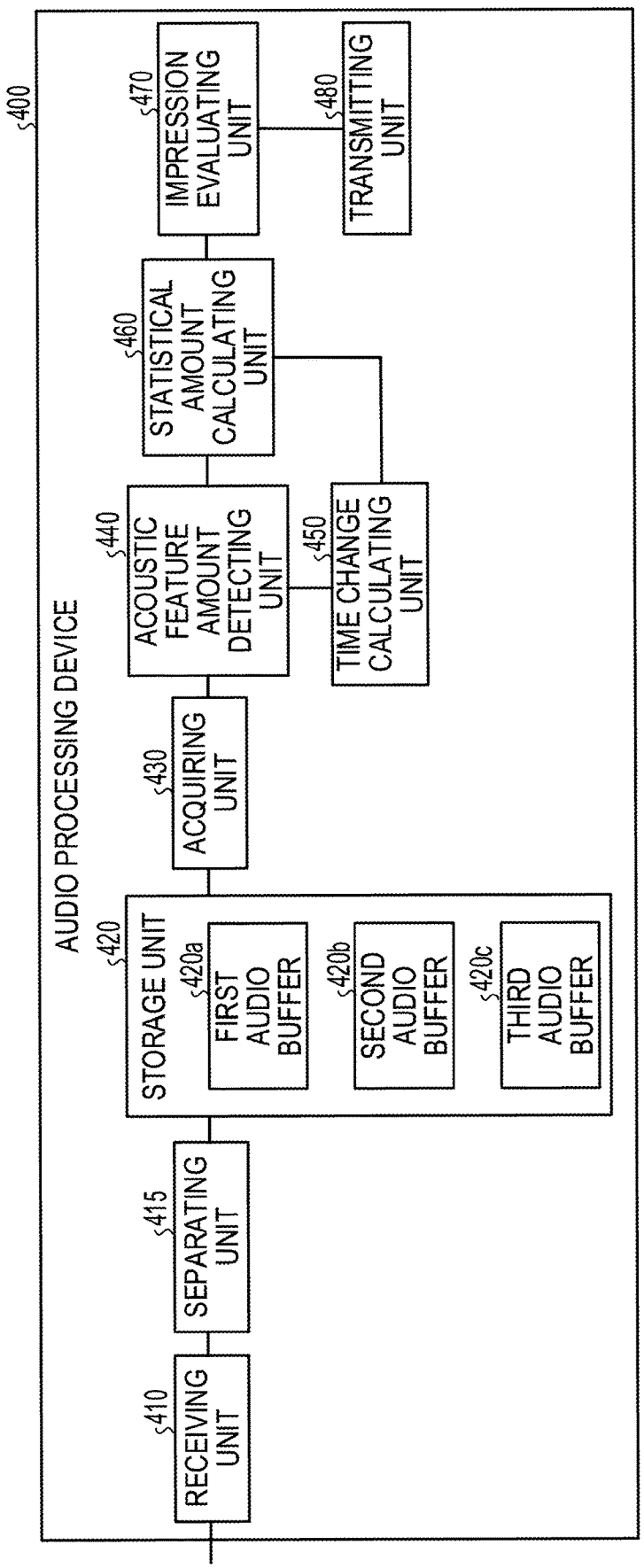
FIG. 17 is a functional block diagram illustrating a configuration of an audio processing device according to the third embodiment.

The audio processing device 400 evaluates the impression of the utterance of each of speakers 1A to 1C based on the first to third audio signals received from the recording device 300. FIG. 17 is a functional block diagram illustrating a configuration of an audio processing device according to the third embodiment. As illustrated in FIG. 17, the audio processing device 400 includes a receiving unit 410, a separating unit 415, a storage unit 420, an acquiring unit 430, an acoustic feature amount detecting unit 440, a time change calculating unit 450, a statistical amount calculating unit 460, an impression evaluating unit 470, and a transmitting unit 480.

The receiving unit 410 is a processing unit that receives information on the first audio signal, the second audio signal, and the third audio signal from the recording device 300. The receiving unit 410 outputs the information on the first audio signal, the second audio signal, and the third audio signal to the separating unit 415.

The separating unit 415 is a processing unit that separates the first audio signal, the second audio signal, and the third audio signal from each other, and records the separated first to third audio signals in the storage unit 420. The separating unit 415 records the first audio signal in a first audio buffer 420a. The separating unit 415 records the second audio signal in a second audio buffer 420b. The separating unit 415 records the third audio signal in a third audio buffer 420c.

The storage unit 420 includes the first audio buffer 420a, the second audio buffer 420b, and the third audio buffer 420c. The storage unit 420 corresponds to the semiconductor memory element such as the RAM, the ROM, or the flash memory, or the storage device such as the HDD.

The first audio buffer 420a holds the first audio signal. The second audio buffer 420b holds the second audio signal. The third audio buffer 420c holds the third audio signal.

The acquiring unit 430 acquires the first audio signal from the first audio buffer 420a and outputs the acquired first audio signal to the acoustic feature amount detecting unit 440. The acquiring unit 430 acquires the second audio signal from the second audio buffer 420b and outputs the acquired second audio signal to the acoustic feature amount detecting unit 440. The acquiring unit 430 acquires the third audio signal from the third audio buffer 420c and outputs the acquired third audio signal to the acoustic feature amount detecting unit 440.

For example, the acquiring unit 430 starts acquiring the second audio signal after the acquisition of the first audio signal stored in the first audio buffer 420a is completed. The acquiring unit 430 starts acquiring the third audio signal after the acquisition of the second audio signal stored in the second audio buffer 420b is completed. In the following description, the first audio signal, the second audio signal, and the third audio signal are collectively referred to simply as "audio signal".

The acoustic feature amount detecting unit 440 is a processing unit that detects a formant frequency from each audio frame included in the audio signal. The formant frequency is an example of the acoustic feature amount. The acoustic feature amount detecting unit 440 outputs information on the formant frequency to the time change calculating unit 450 and the statistical amount calculating unit 460.

The acoustic feature amount detecting unit 440 extracts a plurality of peaks by performing linear prediction (Liner Prediction Coding) analysis on, for example, an audio signal C(t) included in the audio frame. The acoustic feature amount detecting unit 440 sets the first formant: F1, the second formant: F2, and the third formant: F3 among the plurality of peaks in a descending order of frequencies. The acoustic feature amount detecting unit 440 detects the information of the first to third formants (e.g., frequency) as the information on the formant frequency. The acoustic feature amount detecting unit 440 may detect the formant frequency using the technique described in a patent literature (Japanese Patent Application Laid-open No. 62-054297).

The time change calculating unit 450 is a processing unit that calculates the time change of the formant frequency. Based on the calculation result of the time change, the time change calculating unit 450 specifies a period in which the change amount of the formant frequency is less than a threshold value TH4. For example, the formant frequency of a predetermined audio frame may be an average frequency of F1, F2, and F3, or any one of F1, F2, and F3 may be set as the formant frequency. The time change calculating unit 450 outputs information of a specified period to the statistical amount calculating unit 460.

The processing of specifying the period in which the change amount of the formant frequency is less than the threshold value TH4 by the time change calculating unit 450 corresponds to processing of replacing the pitch frequency with the formant frequency and replacing the threshold value TH1 with the threshold value TH4 in the processing performed by the time change calculating unit 150.

The statistical amount calculating unit 460 is a processing unit that calculates the statistical amount of the acoustic feature amount based on the information of the period in which the change amount of the formant frequency is less than the threshold value TH4 and the acoustic feature amount (formant frequency). The processing of calculating the statistical amount by the statistical amount calculating unit 460 corresponds to the processing of calculating the statistical amount by the statistical amount calculating unit 160. The statistical amount calculating unit 460 outputs the information on the statistical amount to the impression evaluating unit 470.

The impression evaluating unit 470 is a processing unit that evaluates the impression of the audio signal (utterance) based on the information on the statistical amount. The impression evaluating unit 470 outputs the evaluation result to the transmitting unit 480. The impression evaluating unit 470 evaluates the impression in the same manner as the impression evaluating unit 170 described in the first embodiment.

However, the impression evaluating unit 470 evaluates the impression of the utterance of speaker 1A based on the statistical amount based on the first audio signal. The impression evaluating unit 470 evaluates the impression of the utterance of speaker 1B based on the statistical amount based on the second audio signal. The impression evaluating unit 470 evaluates the impression of the utterance of speaker 1C based on the statistical amount based on the third audio signal.

The transmitting unit 480 is a processing unit that transmits the information of the evaluation result received from the impression evaluating unit 470 to the display device 350.

Figure 18:
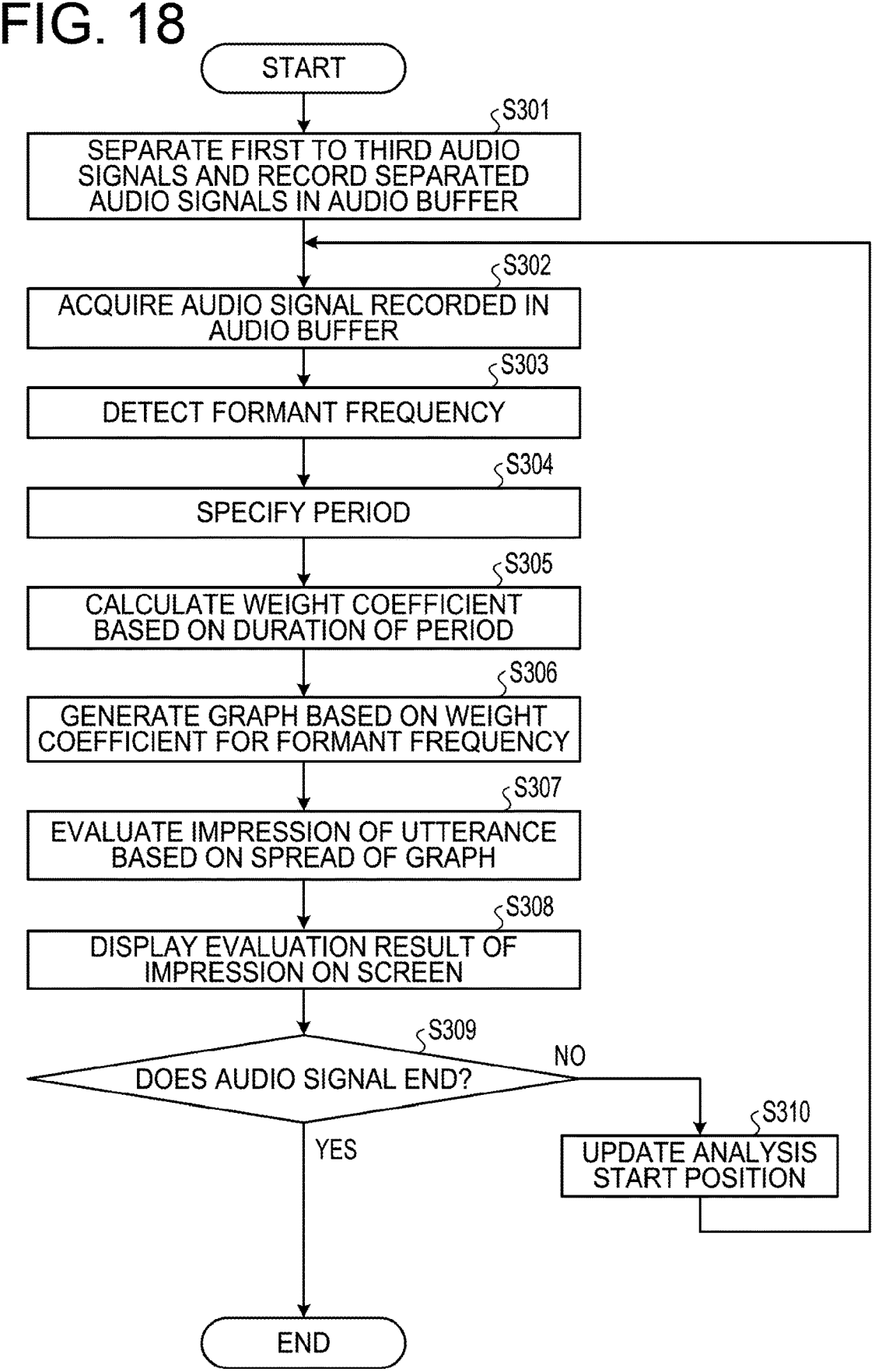
FIG. 18 is a flowchart illustrating a processing order of an audio processing device according to the third embodiment.

Next, descriptions will be made on an example of the processing order of the audio processing device according to the third embodiment. FIG. 18 is a flowchart illustrating a processing order of the audio processing device according to the third embodiment. As illustrated in FIG. 18, the separating unit 415 of the audio processing device 400 separates the first to third audio signals and records the separated audio signals in the respective audio buffers 420a to 420c (operation S301).

The acquiring unit 430 acquires the audio signals recorded in the respective audio buffers 420a to 420c (operation S302). The acoustic feature amount detecting unit 440 of the audio processing device 400 detects the formant frequency from the audio signal (operation S303).

The time change calculating unit 450 of the audio processing device 400 specifies a period in which the change amount is less than the threshold value TH4 based on each formant frequency (operation S304). The statistical amount calculating unit 460 of the audio processing device 400 calculates the weight coefficient based on the duration of the period (operation S305).

The statistical amount calculating unit 460 generates the graph based on the weight coefficient corresponding to the formant frequency (operation S306). The impression evaluating unit 470 of the audio processing device 400 evaluates the impression of the utterance based on the spread of the graph (operation S307).

The impression evaluating unit 470 displays the evaluation result of the impression on the display device 350 (operation S308). When the audio signal ends ("Yes" in operation S309), the audio processing device 400 ends the processing. In the meantime, when the audio signal does not end ("No" in operation S309), the audio processing device 400 updates the analysis start position (operation S310) and proceeds to operation S302.

Next, descriptions will be made on the effect of the audio processing device 400 according to the third embodiment. The audio processing device 400 specifies a period in which a formant change amount is less than a threshold value TH4 and sets the number of times corresponding to the formant frequency detected in the period to be smaller than the number of times for the formant frequency detected in the other period, and calculates the graph (frequency distribution). As a result, since the spread of the graph may be suppressed due to the utterance hesitation, the impression on the utterance may be accurately estimated.

Fourth Embodiment

Figure 19:
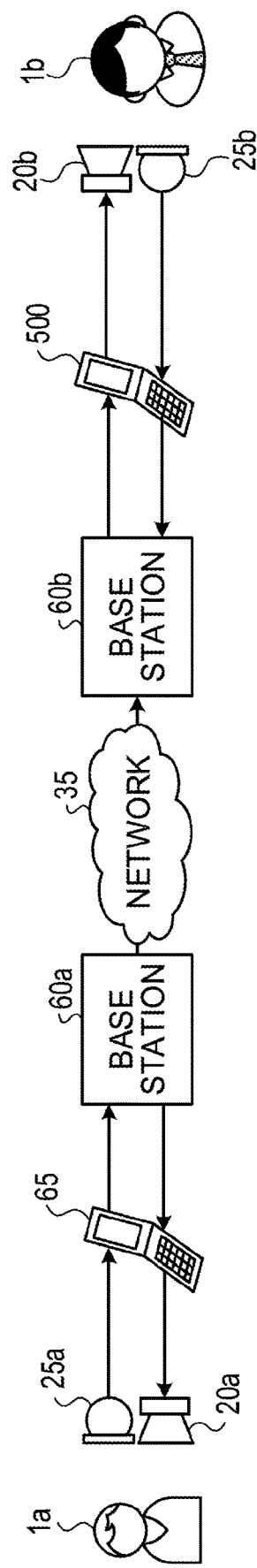
FIG. 19 is a diagram illustrating a configuration of a system according to a fourth embodiment.

FIG. 19 is a diagram illustrating a configuration of a system according to a fourth embodiment. As illustrated in FIG. 19, the system includes a portable terminal 65, base stations 60a and 60b, and an audio processing device 500. The portable terminal 65 is connected to the speaker 20a and the microphone 25a. The audio processing device 500 is connected to a speaker 20b and a microphone 25b.

The base stations 60a and 60b are connected to each other via the network 35. The base stations 60a and 60b are devices that relay the audio signal transmitted from the portable terminal 65 or the audio processing device 500. For example, the base station 60b transmits the audio signal transmitted from the portable terminal 65 to the audio processing device 500.

The portable terminal 65 corresponds to a mobile phone, a smart phone, a tablet terminal, a notebook personal computer (PC), or the like. The portable terminal 65 acquires the audio signal of speaker 1a via the microphone 25a. The portable terminal 65 is wirelessly connected to the base station 60a to transmit the acquired audio signal of speaker 1a to the audio processing device 500. The audio signal transmitted to the audio processing device 500 is output by the speaker 20b.

The audio processing device 500 corresponds to the mobile phone, the smart phone, the tablet terminal, the notebook personal computer (PC), or the like. In addition to the call function, the audio processing device 500 evaluates the utterance of speaker 1a and displays the evaluation result.

Figure 20:
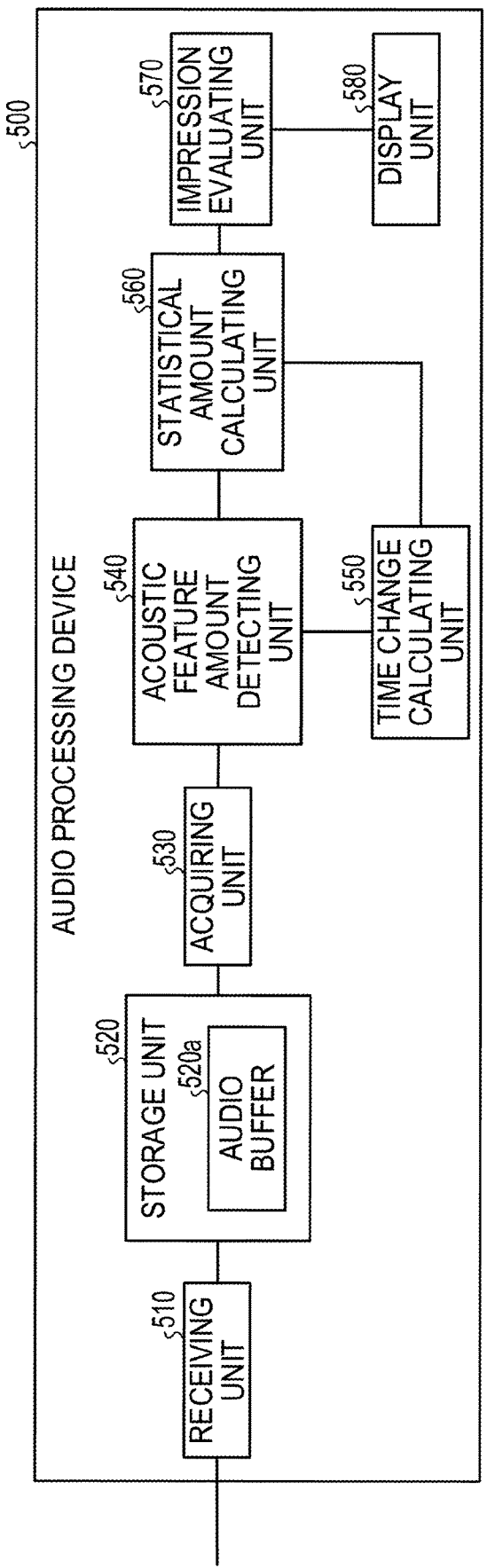
FIG. 20 is a functional block diagram illustrating a configuration of an audio processing device according to the fourth embodiment.

FIG. 20 is a functional block diagram illustrating a configuration of an audio processing device according to a fourth embodiment. As illustrated in FIG. 20, the audio processing device 500 includes a receiving unit 510, a storage unit 520, an acquiring unit 530, an acoustic feature amount detecting unit 540, a time change calculating unit 550, a statistical amount calculating unit 560, an impression evaluating unit 570, and a display unit 580. Further, although the audio processing device 500 has the call function as described with reference to FIG. 19, the call function is similar to a known call function, and thus, the description thereof will be omitted.

The receiving unit 510 is a processing unit that receives the audio signal of the speaker 1a from the portable terminal 65. The receiving unit 510 records the received audio signal in an audio buffer 520a of the storage unit 520.

The storage unit 520 has the audio buffer 520a. The storage unit 520 corresponds to the semiconductor memory element such as the RAM, the ROM, or the flash memory, or the storage device such as the HDD.

The audio buffer 520a is a buffer that holds the audio signal of speaker 1a. For example, it is assumed that the audio signal is information in which a plurality of audio frames for each predetermined period is arranged in time series. The audio frame is information in which the time and a magnitude of the audio signals in a predetermined period correspond to each other.

The acquiring unit 530 is a processing unit that acquires the audio signal from the audio buffer 520a. The acquiring unit 530 outputs the acquired audio signal to the acoustic feature amount detecting unit 540.

The acoustic feature amount detecting unit 540 is a processing unit that detects a spectrum power from each audio frame included in the audio signal. The spectrum power is an example of the acoustic feature amount. The acoustic feature amount detecting unit 540 outputs information on the spectrum power to the time change calculating unit 550 and the statistical amount calculating unit 560.

For example, the acoustic feature amount detecting unit 540 performs faster Fourier transform (FFT) with the respect to the audio frame to detect a power spectrum density of each frequency. For example, the acoustic feature amount detecting unit 540 may detect a relationship SP(n, f) between the frequency and the power spectrum density as the power spectrum or may detect the maximum value, the average value, or the like of the power spectrum density as the spectrum power.

The time change calculating unit 550 is a processing unit that calculates the time change of the spectrum power. Based on the calculation result of the time change, the time change calculating unit 550 specifies a period in which the change amount of the spectrum power is less than a threshold value TH5. For example, the change amount of the spectrum power is the sum of a difference between the spectrum power of each frequency of the (n−1)-th audio frame and the spectrum power of each frequency of the n-th audio frame. The time change calculating unit 550 outputs information of the specified period to the statistical amount calculating unit 560.

The statistical amount calculating unit 560 is a processing unit that calculates the statistical amount of the acoustic feature amount based on the information of the period in which the change amount of the spectrum power is less than the threshold TH5 and the acoustic feature amount (spectrum power). The processing of calculating the statistical amount by the statistical amount calculating unit 560 corresponds to the processing of calculating the statistical amount by the statistical amount calculating unit 160. The statistical amount calculating unit 560 outputs the information on the statistical amount to the impression evaluating unit 570.

The impression evaluating unit 570 is a processing unit that evaluates the impression of the audio signal (utterance) based on the information of the statistical amount. The impression evaluating unit 570 displays an evaluation result on the display unit 580. The impression evaluating unit 570 evaluates the impression in the same manner as the impression evaluating unit 170 described in the first embodiment.

The evaluation result of the impression evaluating unit 170 described in the first embodiment is set as the evaluation result of any one of "impression is good", "normal", and "impression is bad", but the impression evaluating unit 570 may output the evaluation result as an evaluation value. For example, the impression evaluating unit 570 evaluates that "evaluation value=1" when the spread contained in the statistical information is wider than the normal spread of the graph. The impression evaluating unit 570 evaluates that "evaluation value=0" when the spread of the graph at the normal time is equal to the spread included in the information of the statistical amount. The impression evaluating unit 570 evaluates that "evaluation value=−1" when the spread contained in the statistical information is narrower than the spread of the graph at the normal time.

The impression evaluating unit 570 calculates the evaluation value for each predetermined period. The impression evaluating unit 570 may smooth the evaluation value based on Equation (3). In Equation (3), score(n) represents the evaluation value before smoothing, and score'(n) represents the evaluation value after smoothing. coef represents a forgetting coefficient, for example, 0.9.

$$\text{score}'(n) = \text{score}'(n-1) \times \text{coef} + \text{score}(n) \times (1-\text{coef}) \quad (3)$$

Figure 21:
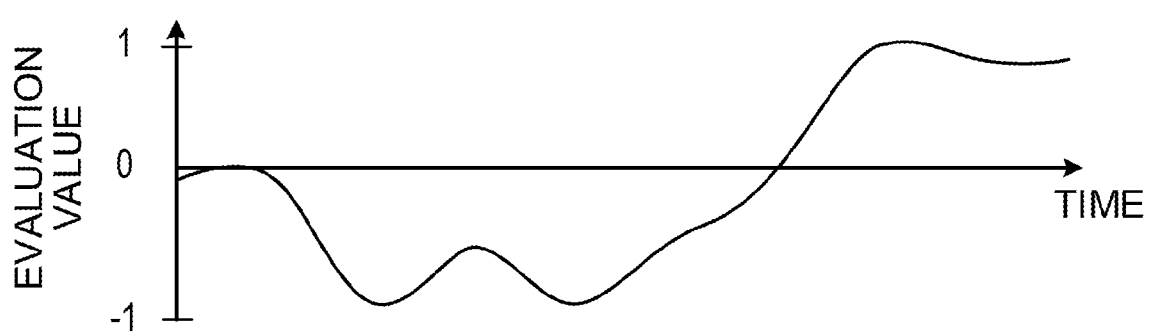
FIG. 21 is a diagram illustrating an example of an evaluation result graph displayed by a display unit according to the fourth embodiment.

The display unit 580 is a display device that displays the evaluation result of the impression evaluating unit 570. For example, the display unit 580 corresponds to a liquid crystal display, a touch panel, or the like. FIG. 21 is a diagram illustrating an example of an evaluation result graph displayed by a display unit according to a fourth embodiment.

As illustrated in FIG. 21, a horizontal axis of the graph of the evaluation result represents an axis corresponding to the time and a vertical axis represents an axis corresponding to the evaluation value after smoothing. The closer the value of the evaluation value is to "1", the better the impression is.

Figure 22:
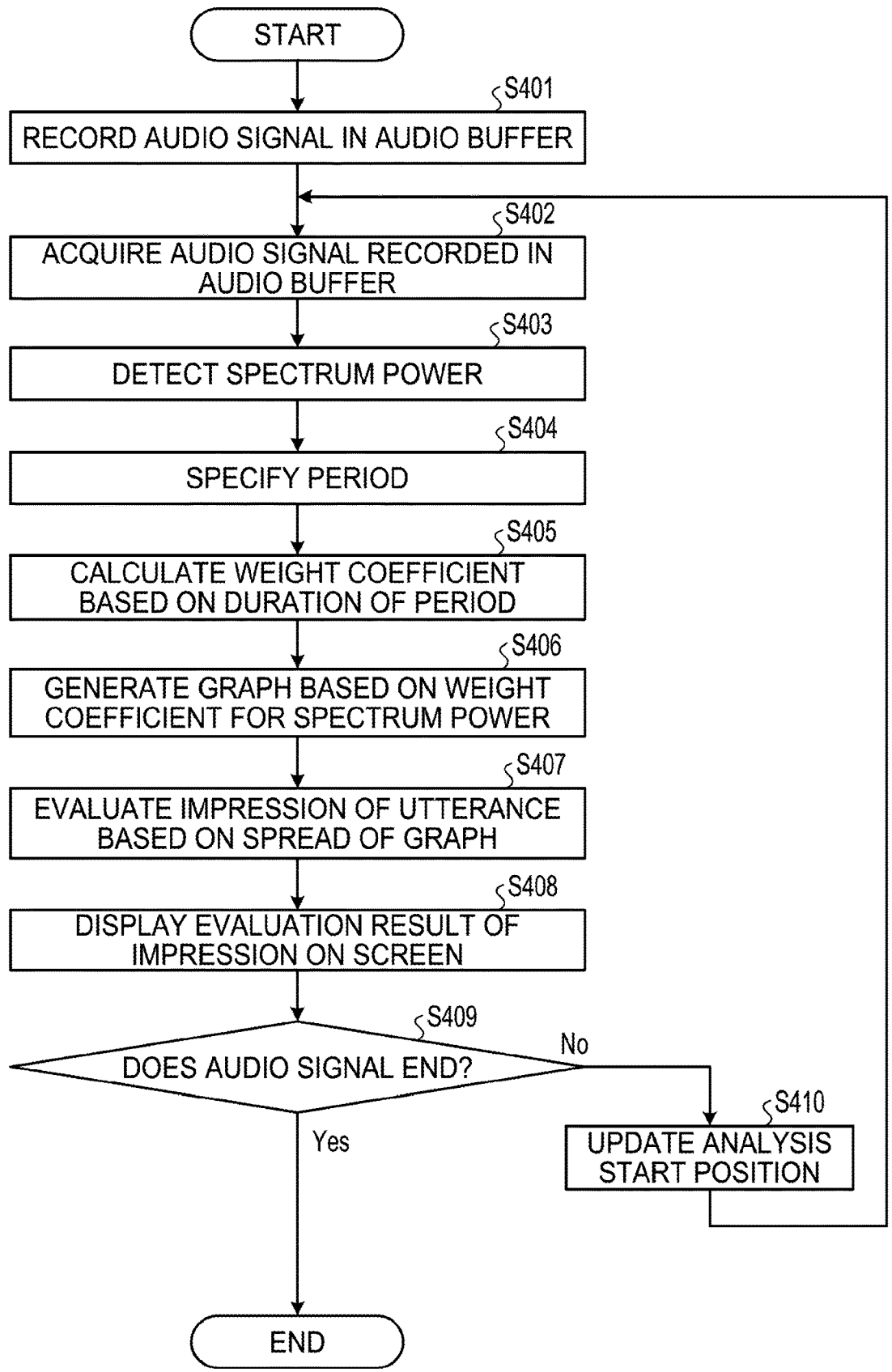
FIG. 22 is a flowchart illustrating a processing order of an audio processing device according to the fourth embodiment.

Next, descriptions will be made on an example of the processing order of the audio processing device according to a fourth embodiment. FIG. 22 is a flowchart illustrating a processing order of the audio processing device according to the fourth embodiment. As illustrated in FIG. 22, the receiving unit 510 of the audio processing device 500 records the audio signal in the audio buffer 520a (operation S401).

The acquiring unit 530 of the audio processing device 500 acquires the audio signal recorded in the audio buffer 520a (operation S402). The acoustic feature amount detecting unit 540 of the audio processing device 500 detects the spectrum power from the audio signal (operation S403).

The time change calculating unit 550 of the audio processing device 500 specifies a period in which the change amount is less than the threshold value TH5 based on each spectrum power (operation S404). The statistical amount calculating unit 560 of the audio processing device 500 calculates the weight coefficient based on the duration of the period (operation S405).

The statistical amount calculating unit 560 generates the graph based on the weight coefficient corresponding to the spectrum power (operation S406). The impression evaluating unit 570 of the audio processing device 500 evaluates the impression of the utterance based on the spread of the graph (operation S407).

The impression evaluating unit 570 displays the evaluation result of the impression on the display unit 580 (operation S408). When the audio signal ends ("Yes" in operation S409), the audio processing device 500 ends the processing. In the meantime, when the audio signal does not end ("No" in operation S409), the audio processing device 500 updates the analysis start position (operation S410) and proceeds to operation S402.

Next, descriptions will be made on the effect of the audio processing device 500 according to the fourth embodiment. The audio processing device 500 specifies a period in which a spectrum power change amount is less than a threshold value TH5 and sets the number of times corresponding to the spectrum power detected in the period to be smaller than the number of times for the spectrum power detected in the other section, and calculates a graph (frequency distribution). As a result, since the spread of the graph may be suppressed due to the utterance hesitation, the impression on the utterance may be accurately estimated.

Figure 23:
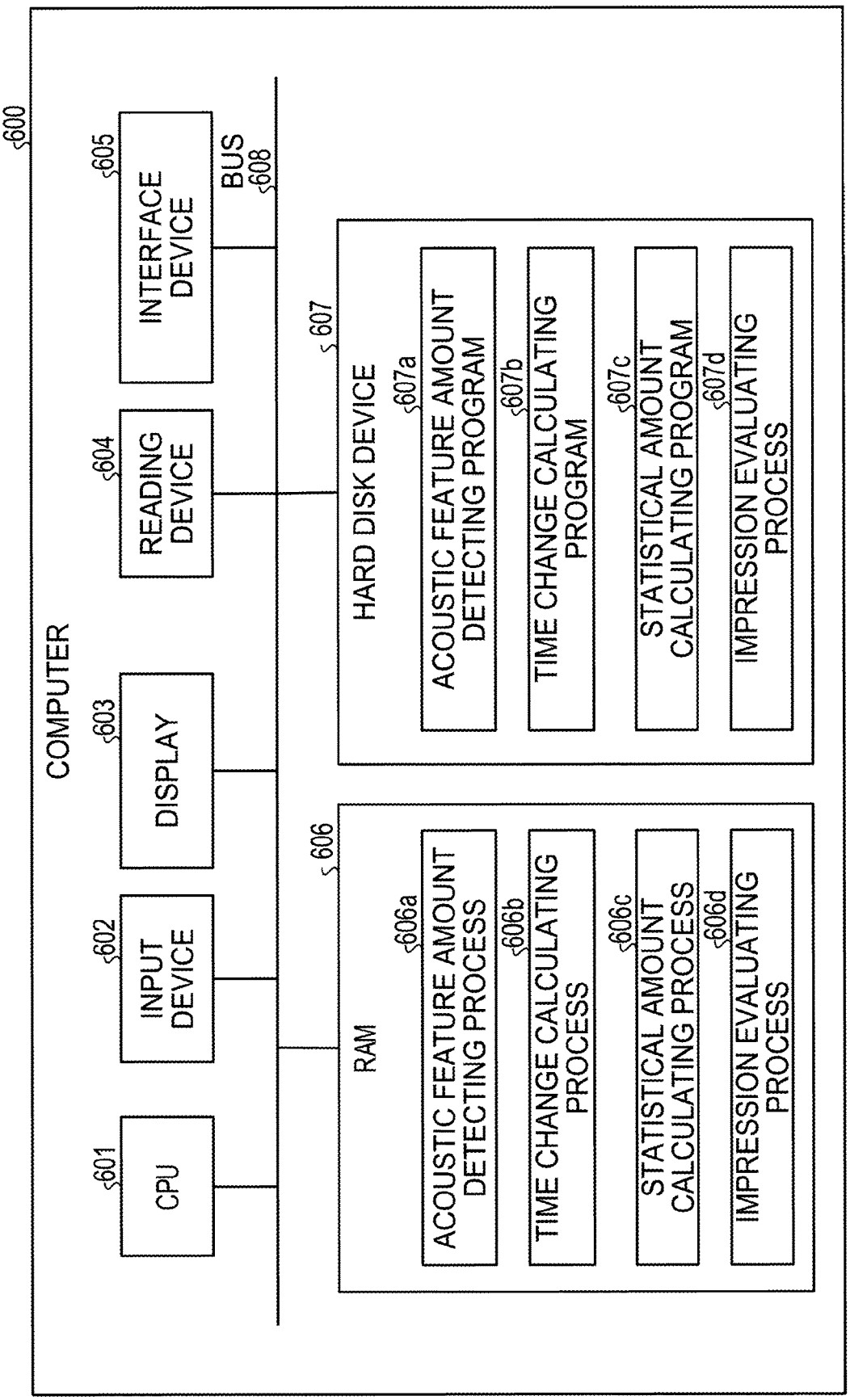
FIG. 23 is a diagram illustrating an example of a hardware configuration of a computer that implements the same function as the audio processing device.

Next, descriptions will be made on an example of hardware configurations of a computer implementing the same functions as the audio processing devices 100, 200, 400, and 500 illustrated in the embodiments. FIG. 23 is a diagram illustrating an example of a hardware configuration of a computer that implements the same function as the audio processing device.

As illustrated in FIG. 23, a computer 600 includes a CPU 601 that executes various operation processing, an input device 602 that receives a data input from a user, and a display 603. Further, the computer 600 includes a reading device 604 reading a program or the like from the storage medium, and an interface device 605 that exchanges data with the recording device or the like through a wired or wireless network. Further, the computer 600 includes a RAM 606 that temporarily stores various kinds of information, and a hard disk device 607. In addition, each of the devices 601 to 607 is connected to a bus 608.

The hard disk device 607 includes an acoustic feature amount detecting program 607a, a time change calculating program 607b, a statistical amount calculating program 607c, and an impression evaluating program 607d. The CPU 601 reads the acoustic feature amount detecting program 607a, the time change calculating program 607b, the statistical amount calculating program 607c, and the impression evaluating program 607d, and develops the programs to RAM 606.

The acoustic feature amount detecting program 607a functions as an acoustic feature amount detecting process 606a. The time change calculating program 607b functions as a time change calculating process 606b. The statistical amount calculating program 607c functions as a statistical amount calculating process 606c. An impression evaluating program 607d functions as an impression evaluating process 606d.

The processing of the acoustic feature amount detecting process 606a corresponds to the processing of the acoustic feature amount detecting units 140, 240, 440, and 540. The processing of the time change calculating processor 606b corresponds to the processing of the time change calculating units 150, 250, 450, and 550. The processing of the statistical amount calculating process 606c corresponds to the processing of the statistical amount calculating units 160, 260, 460, and 560. The processing of the impression evaluating process 606d corresponds to the processing of the impression evaluating units 170, 270, 470, and 570.

The respective programs 607a to 607d may not be stored in the hard disk device 607 from the beginning. For example, each program is stored in a "portable physical medium" such as a flexible disk (FD), a CD-ROM, a DVD disk, a magneto-optic disk, an IC card, or the like inserted into the computer 600. Then, the computer 600 may read and execute the programs 607a to 607d.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An audio processing device comprising:
a memory; and
a processor coupled to the memory and the processor configured to:
detect a first acoustic feature amount and a second acoustic feature amount of an input audio;
calculate a time change amount of the first acoustic feature amount;
specify a period in which the time change amount of the first acoustic feature amount is less than a first threshold value;
calculate a coefficient for the second acoustic feature amount according to a length of the period, wherein the coefficient is a first value when the length of the period is less than a second threshold value and the coefficient is a second value when the length of the period is equal to or greater than the second threshold value; and
calculate a statistical amount for the second acoustic feature amount based on the coefficient.

2. An audio processing method comprising:
detecting a first acoustic feature amount and a second acoustic feature amount of an input audio;
calculating a time change amount of the first acoustic feature amount;
specifying a period in which the time change amount of the first acoustic feature amount is less than a first threshold value;
calculating a coefficient for the second acoustic feature amount according to a length of the period, wherein the coefficient is a first value when the length of the period is less than a second threshold value and the coefficient is a second value when the length of the period is equal to or greater than the second threshold value; and
calculating a statistical amount for the second acoustic feature amount based on the coefficient, by a processor.

3. A computer-readable non-transitory recording medium storing a program that causes a computer to execute a procedure, the procedure comprising:
detecting a first acoustic feature amount and a second acoustic feature amount of an input audio;
calculating a time change amount of the first acoustic feature amount;
specifying a period in which the time change amount of the first acoustic feature amount is less than a first threshold value;
calculating a coefficient for the second acoustic feature amount according to a length of the period, wherein the coefficient is a first value when the length of the period is less than a second threshold value and the coefficient is a second value when the length of the period is equal to or greater than the second threshold value; and
calculating a statistical amount for the second acoustic feature amount based on the coefficient.

4. The computer-readable non-transitory recording medium according to claim 3, wherein the procedure further comprising:
evaluating an impression of the input audio based on the statistical amount.

5. The computer-readable non-transitory recording medium according to claim 3, wherein the input audio includes a plurality of audio frames arranged in time series, and
wherein the procedure, in the specifying the period, specifies a period in which a difference between the first acoustic feature amount of a past audio frame and the first acoustic feature amount of a current audio frame is less than a third threshold value.

6. The computer-readable non-transitory recording medium according to claim 3, wherein the procedure, in the specifying the period, specifies a period in which a variance of the first acoustic feature amount is less than a third threshold value.

7. The computer-readable non-transitory recording medium according to claim 3, wherein, the procedure, in the calculating the coefficient, calculates a coefficient of which value decreases as the length of the period becomes longer.

8. The computer-readable non-transitory recording medium according to claim 3, wherein the procedure, in the calculating the statistical amount, calculates the statistical amount based on a second acoustic feature amount in which the length of the period is less than a third threshold value among the plurality of second acoustic feature amounts.

9. The computer-readable non-transitory recording medium according to claim 3, wherein the procedure, in the calculating the statistical amount, calculates at least one of a spread, an average value, a minimum value, and a maximum value of a frequency distribution of the second acoustic feature amount as the statistical amount.

10. The computer-readable non-transitory recording medium according to claim 3, wherein the procedure, in the detecting the first acoustic feature amount and the second acoustic feature amount of the input audio, detects a pitch frequency of the input audio as the first acoustic feature amount or second acoustic feature amount.

11. The computer-readable non-transitory recording medium according to claim 3, wherein the procedure, in the detecting the first acoustic feature amount and the second acoustic feature amount of the input audio, detects a power of the input audio as the first acoustic feature amount or the second acoustic feature amount.

12. The computer-readable non-transitory recording medium according to claim 3, wherein the procedure detects, in the detecting the first acoustic feature amount and the second acoustic feature amount of the input audio, a formant frequency of the input audio as the first acoustic feature amount or the second acoustic feature amount.

13. The computer-readable non-transitory recording medium according to claim 3, wherein the procedure detects, in the detecting the first acoustic feature amount and the second acoustic feature amount of the input audio, a spectrum power of the input audio as the first acoustic feature amount or second acoustic feature amount.

\* \* \* \* \*